(12) United States Patent
Kim et al.

(10) Patent No.: US 8,695,618 B2
(45) Date of Patent: Apr. 15, 2014

(54) 3D CHEMICAL PATTERN CONTROL IN 2D FLUIDICS DEVICES

(75) Inventors: Yong Tae Kim, Pittsburgh, PA (US); William C. Messner, Pittsburgh, PA (US); Philip R. LeDuc, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 169 days.

(21) Appl. No.: 13/334,346

(22) Filed: Dec. 22, 2011

(65) Prior Publication Data

US 2013/0014828 A1 Jan. 17, 2013

Related U.S. Application Data

(60) Provisional application No. 61/459,975, filed on Dec. 22, 2010.

(51) Int. Cl.
*F17D 3/00* (2006.01)

(52) U.S. Cl.
USPC ............ 137/3; 137/607; 700/285; 366/160.1; 366/173.1

(58) Field of Classification Search
CPC ..................... B01F 13/0059; F16K 2099/0084
USPC ............... 137/2, 3, 607, 896, 897; 366/150.1, 366/160.1, 162.4, 167.1, 173.1, 176.2, 366/177.1, 182.1; 700/285
See application file for complete search history.

(56) References Cited

U.S. PATENT DOCUMENTS

| | | | |
|---|---|---|---|
| 5,711,871 A * | 1/1998 | Miltenyi | ............ 210/86 |
| 5,779,892 A | 7/1998 | Miltenyi et al. | |
| 5,786,161 A | 7/1998 | Irsch et al. | |
| 5,877,299 A | 3/1999 | Thomas et al. | |
| 6,190,870 B1 | 2/2001 | Schmitz et al. | |
| 6,342,344 B1 | 1/2002 | Thomas et al. | |
| 6,417,011 B1 | 7/2002 | Miltenyi | |
| 6,468,432 B1 | 10/2002 | Miltenyi et al. | |
| 6,482,926 B1 | 11/2002 | Thomas et al. | |
| 6,491,918 B1 | 12/2002 | Thomas et al. | |
| 6,610,544 B2 | 8/2003 | Lin et al. | |
| 6,645,727 B2 | 11/2003 | Thomas et al. | |

(Continued)

OTHER PUBLICATIONS

Robin H. Liu et al., "Passive Mixing in a Three-Dimensional Serpentine Microchannel," Journal of Microelectromechanical Systems, vol. 9, No. 2, Jun. 2000.

(Continued)

*Primary Examiner* — John Rivell
*Assistant Examiner* — Reinaldo Sanchez-Medina
(74) *Attorney, Agent, or Firm* — Downs Rachlin Martin PLLC

(57) ABSTRACT

Methods of controllably creating three-dimensional (3D) combined-flow-interface patterns in multi-lane fluidic devices, and systems, apparatuses and software therefor. In one example, the 3D-pattern is created and varied as a function of one or more of the geometry of the inlets to a main fluidic channel in which the 3D-pattern is formed, the Reynolds number of the flows, the dimensions of the main fluidic channel and the inlets, and the spacing of adjacent inlets. In one embodiment particularly disclosed, differing 3D combined-flow-interface patterns are created using a three-lane fluidic device having a fixed inlet geometry. In another embodiment particularly disclosed, differing 3D combined-flow-interface patterns are created using a five-lane fluidic device having a fixed inlet geometry that can be used to effectively mimic variable inlet geometries.

27 Claims, 11 Drawing Sheets

(56) References Cited

U.S. PATENT DOCUMENTS

| | | |
|---|---|---|
| 6,730,230 B2 | 5/2004 | Cook et al. |
| 6,808,683 B2 | 10/2004 | Gilbert |
| 6,814,938 B2 | 11/2004 | Karp et al. |
| 6,849,459 B2 | 2/2005 | Gilbert et al. |
| 6,877,528 B2 | 4/2005 | Gilbert et al. |
| 6,878,271 B2 | 4/2005 | Gilbert et al. |
| 6,883,957 B2 | 4/2005 | Gilbert et al. |
| 6,900,029 B1 | 5/2005 | Coulter et al. |
| 7,030,228 B1 | 4/2006 | Schmitz et al. |
| 7,041,257 B2 | 5/2006 | Gilbert et al. |
| 7,041,362 B2 | 5/2006 | Barbera-Guillem |
| 7,079,241 B2 | 7/2006 | Empedocles et al. |
| 7,094,345 B2 | 8/2006 | Gilbert et al. |
| 7,108,915 B2 | 9/2006 | Adams et al. |
| 7,119,248 B1 | 10/2006 | Rajewsky et al. |
| 7,135,340 B2 | 11/2006 | Wognum et al. |
| 7,145,039 B2 | 12/2006 | Chu et al. |
| 7,153,699 B2 | 12/2006 | Gilbert et al. |
| 7,166,423 B1 | 1/2007 | Miltenyi et al. |
| 7,172,791 B2 | 2/2007 | Treadway et al. |
| 7,211,442 B2 | 5/2007 | Gilbert et al. |
| 7,258,839 B2 | 8/2007 | Gilbert et al. |
| 7,293,581 B2 | 11/2007 | Gilbert et al. |
| 7,298,478 B2 | 11/2007 | Gilbert et al. |
| 7,316,932 B2 | 1/2008 | Woodside |
| 7,393,632 B2 | 7/2008 | Cheo et al. |
| 7,554,657 B2 | 6/2009 | Bosio |
| 7,611,309 B2 | 11/2009 | Gilbert et al. |
| 7,638,285 B2 | 12/2009 | Stingl et al. |
| 2002/0177176 A1 | 11/2002 | Thomas et al. |
| 2003/0147886 A1 | 8/2003 | Thomas et al. |
| 2004/0109793 A1 | 6/2004 | McNeely et al. |
| 2005/0092681 A1* | 5/2005 | Higashino et al. ............ 210/634 |
| 2005/0123450 A1 | 6/2005 | Gilbert et al. |
| 2006/0134696 A1 | 6/2006 | Chiem et al. |
| 2006/0269446 A1 | 11/2006 | Gilbert et al. |
| 2006/0285983 A1 | 12/2006 | Bunner et al. |
| 2007/0101446 A1 | 5/2007 | Rajewsky et al. |
| 2008/0087584 A1 | 4/2008 | Johnson et al. |
| 2008/0131323 A1* | 6/2008 | Kuczenski et al. ......... 422/82.13 |
| 2009/0053799 A1 | 2/2009 | Chang-Yen et al. |
| 2009/0291463 A1 | 11/2009 | Gilbert et al. |

OTHER PUBLICATIONS

Hengzi Wang et al., "Numerical Investigation of Mixing in Microchannels with Patterned Grooves," Journal of Micromechanics and Microengineering, 13 (2003) 801-808.

Dino Di Carlo et al., "Continuous Inertial Focusing, Ordering, and Separation of Particles in Microchannels," Proceedings of the National Academy of Sciences of the United States of America, Nov. 27, 2007, vol. 104, No. 48.

D. L. Hitt et al., "Confocal Imaging of Flows in Artificial Venular Bifurcations," Journal of Biomechanical Engineering Transactions of the ASME, vol. 121, Apr. 1999, 170-177.

D. L. Hitt et al., "A Simplified Model for Determining Interfacial Position in Convergent Microchannel Flows," Journal of Fluids Engineering, Transactions of the ASME, 758-767, vol. 126, Sep. 2004.

Zhigang Wu et al., "Hydrodynamic Focusing in Microchannels under Consideration of Diffusive Dispersion: Theories and Experiments," Sensors and Actuators B 107 (2005) 965-974.

Minsoung Rhee et al., "Microfluidic Assembly Blocks," Lab Chip, 2008, 8, 1365-1373.

Kang Sun et al., "Modular Microfluidics for Gradient Generation," Lab Chip, 2008, 8, 1536-1543.

Po Ki Yuen, "SmartBuild—A Truly Plug-N-Play Modular Microfluidic System," Lab Chip, 2008, 8, 1374-1378.

Xiaole Mao et al., "Single-Layer Planar On-Chip Flow Cytometer Using Microfluidic Drifting Based Three-Dimensional (3D) Hydrodynamic Focusing," Lab Chip, 2009, 9, 1583-1589.

Chia-Hsien Hsu et al., "Microvortex for Focusing, Guiding and Sorting of Particles," Lab Chip, 2008, 8, 2128-2134.

Myung Gwon Lee et al., "Three-Dimensional Hydrodynamic Focusing with a Single Sheath Flow in a Single-Layer Microfluidic Device," Lab Chip, 2009, 9, 3155-3160.

J. Patrick Shelby et al., "High Radial Acceleration in Microvortices," Nature, vol. 425, Sep. 4, 2003.

Todd Thorsen et al., "Dynamic Pattern Formation in a Vesicle-Generating Microfluidic Device," Physical Review Letters, vol. 86, No. 18, Apr. 30, 2001.

* cited by examiner

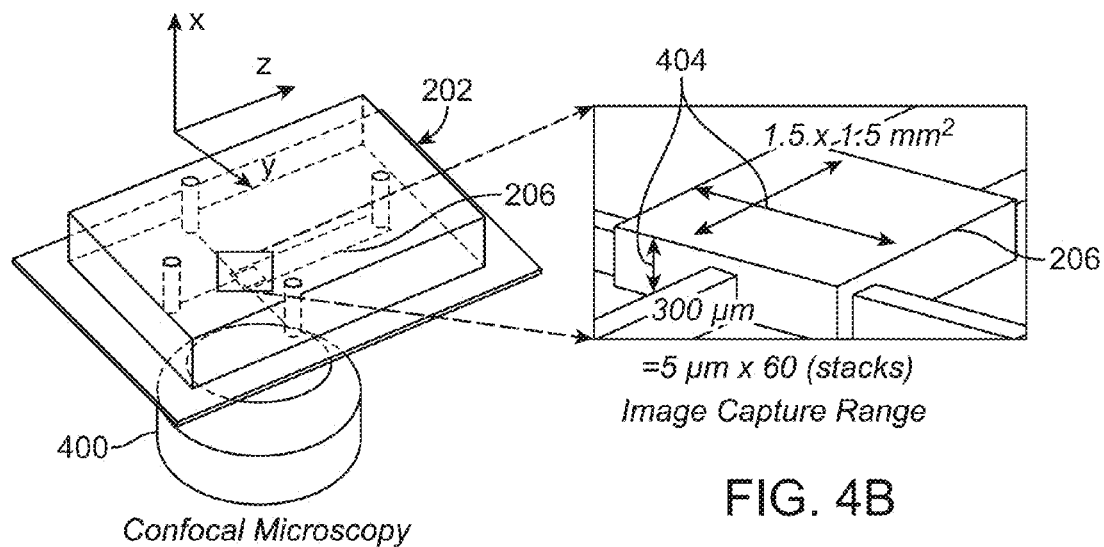
FIG. 4A
FIG. 4B
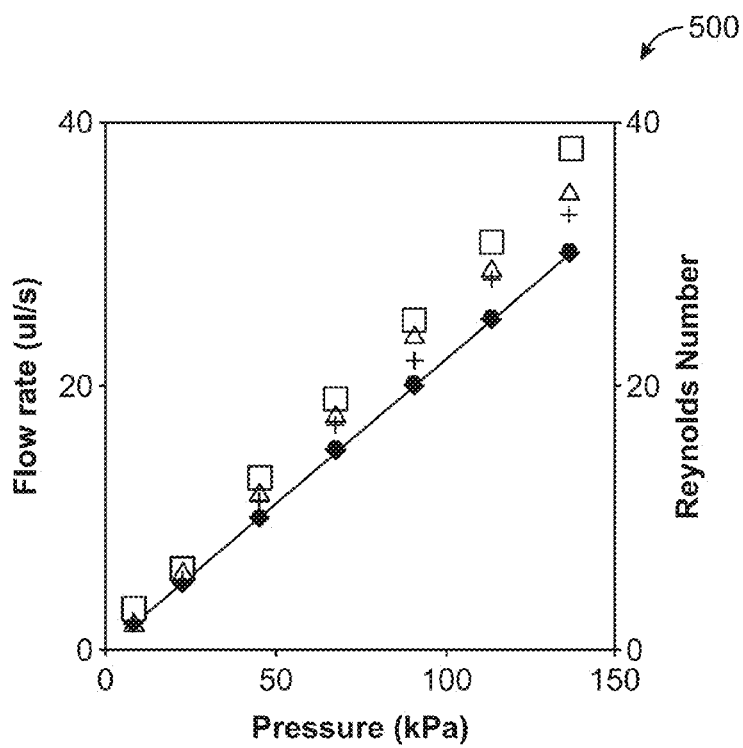
FIG. 5

3D CHEMICAL PATTERN CONTROL IN 2D FLUIDICS DEVICES

RELATED APPLICATION DATA

This application claims the benefit of priority of U.S. Provisional Patent Application Ser. No. 61/459,975, filed on Dec. 22, 2010, and titled "Methods, Apparatuses, and Systems for Three-Dimensional Chemical Pattern Control Using Two-Dimensional Modular Microfluidics," which is incorporated by reference herein in its entirety.

This invention was made in part with government support under National Science Foundation grant CMS-0555513. The government may have certain rights in this invention.

FIELD OF THE INVENTION

The present invention generally relates to the field of multi-input fluidics. In particular, the present invention is directed to 3D chemical pattern and flow control in 2D fluidics devices.

BACKGROUND

The ability to specify or control spatiotemporal chemical environments is critical for controlling diverse processes from chemical synthesis to cellular responses. When established by microfluidics methods, this chemical control has largely been limited to two dimensions and by the need for using complex approaches. The ability to create three-dimensional (3D) chemical patterns is becoming more critical as microfluidics is beginning to have novel applications at larger millifluidic scales including model organism behavior, embryonic development and optofluidics.

Conventional spatiotemporal manipulation of 3D chemical patterns requires highly integrated microdevices that have proven successful in diverse fields ranging from biological response to chemical interface applications. Microfabrication approaches have enabled high-throughput microcomponents (e.g., sensors, mixers, valves, pumps) to be coupled together into multi-layer microfluidic devices. However, miniaturizing and integrating a diversity of complex elements can be technically challenging, time consuming, and expensive.

SUMMARY OF THE DISCLOSURE

In one implementation, the present disclosure is directed to a method including directing multiple fluid streams into a main fluidic channel so as to form a combined-flow interface; and controlling the relative flows among the multiple fluid streams in a manner that tunes the combined flow interface to a desired first three-dimensional (3D) pattern.

In another implementation, the present disclosure is directed to a system including a fluidic device that includes a main fluidic channel and multiple inlets fluidly communicating with the main fluidic channel; a fluid delivery system in fluid operatively configured to provide multiple fluid streams, in a one-to-one manner, to the multiple inlets so that the fluid streams form a flow interface within the main fluidic channel when the system is operating; and a 3D-pattern controller designed and configured to control the fluid delivery system in a manner that tunes the flow interface to a desired first 3D-pattern.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4A is an enlarged perspective view of the three-lane fluidic module of the system of FIG. 2;

FIG. 4B is a further-enlarged perspective view of the three-lane fluidic module of FIG. 4A;

FIG. 5 is a graph of flow rate and Reynolds numbers used in experiments with the fluidic system of FIG. 2;

FIG. 12B is a table of renderings illustrating transverse slices of 3D combined-flow-interface patterns achieved during the controlled-pressures illustrated in the combined graph of FIG. 11A;

DETAILED DESCRIPTION

In one aspect, the present disclosure is directed to methods and systems that utilize a simple two-dimensional (2D) fluidics approach to forming desired chemical patterns and levels of focus using multilane fluidic devices. These systems and methods are applicable to a wide variety of fluidics and other applications, such as applications in the transition realm from micron to millimeter scale. As described below, systems and methods of the present invention can be used to produce non-linear three-dimensional (3D) combined-flow-interface patterns by manipulating critical parameters within a multilane fluidic device, such as Reynolds number, inlet geometry, and channel height. The methods disclosed herein are versatile and can be applied to create and control various 3D combined-flow-interface patterns with a 2D system. Various aspects of the present invention are particularly relevant, though not exclusively, to fluidic applications that are larger in size than traditional microfluidics, such as fluidic applications in the range of hundreds of microns to multiple millimeters, and have a variety of flow conditions. Areas of application of the present invention include, but are not limited to, flow cytometry, and studies of embryonic development, chemical reactions, and optical imaging.

Figure 1:
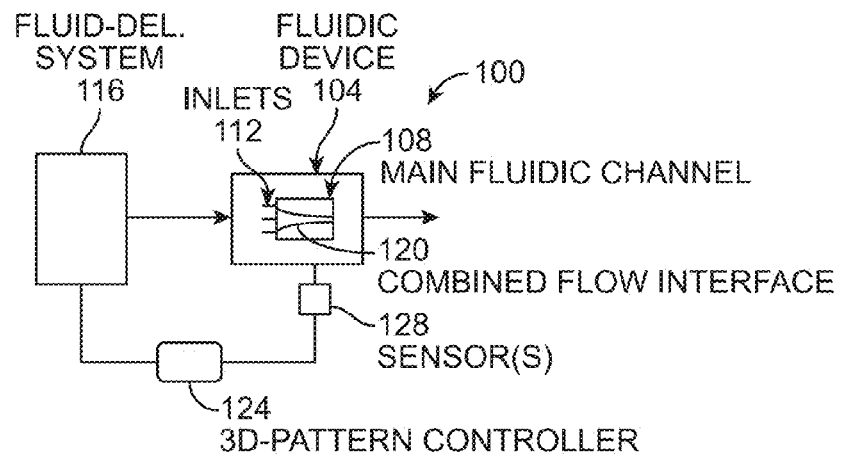
FIG. 1 is a block diagram illustrating a fluidic system made in accordance with the present invention.

Turning now to the drawings, FIG. 1 illustrates an exemplary fluidic system 100 embodying various aspects of the present invention. System 100 includes a multilane fluidic device 104, i.e., a fluidic device that includes a main fluidic channel 108 having multiple flow inlets 112 designed and configured to introduce a corresponding number of fluid streams (not shown) into the main fluidic channel. As used herein and in the appended claims, the term "multilane" refers to the fact that the main fluidic channel (108 in FIG. 1) has multiple fluid-stream inlets (three inlets 112 in FIG. 1). The term "multilane" as used in the context of the present disclosure should not be construed as imparting any particular arrangement, directionality, or orientation, but rather only a number of inlets. In the example of FIG. 1, multilane fluidic device 104 has three flow inlets 112, but other numbers of inlets can certainly be used and can have certain benefits, as in the case of the 5-inlet, or lane, example of FIGS. 9A-B.

Exemplary system 100 also includes a fluid-delivery system 116 designed and configured to deliver at least two differing fluids/fluid compositions to main fluidic channel 108 via fluid-stream inlets 112. Fluid-delivery system 116 can include any components (not shown) suitable for providing the fluid streams to main fluidic channel 108 with a highly controlled flow rate. Examples of such components include gas-pressurized reservoirs, one or more pressurized gas sources, one or more fluid resistor modules, fluid pumps, etc. Those skilled in the art will readily understand how to select suitable components for fluid-delivery system 116 after reading this entire disclosure. One example of a suitable fluid-delivery system is described below in connection with FIG. 2. However, that is certainly not the only type of fluid-delivery system that could be used.

Figure 8A:
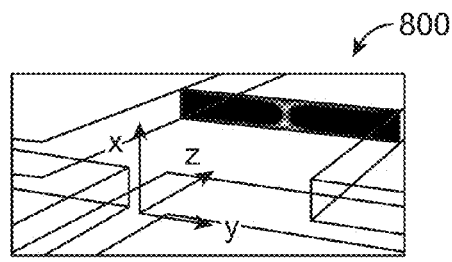
FIG. 8A is a diagram illustrating a transverse slice of a 3D combined-flow-interface pattern within the main fluidic channel of the fluidic system of FIG. 2 when the channel has a T-inlet geometry.
Figure 8B:
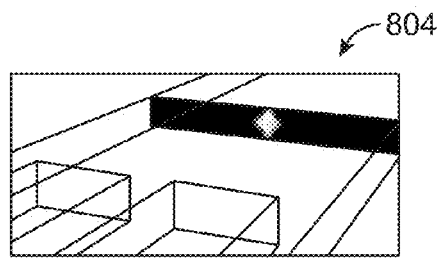
FIG. 8B is a diagram illustrating a transverse slice of a 3D combined-flow-interface pattern within the main fluidic channel of the fluidic system of FIG. 2 when the channel has a P-inlet geometry.
Figure 8C:
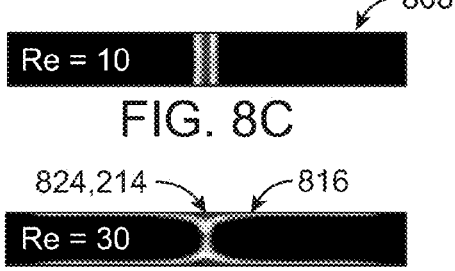
FIG. 8C is a rendering illustrating a transverse slice of a 3D combined-flow-interface pattern in the main fluidic channel of the fluidic system of FIG. 2 under conditions in which the Reynolds number is ~10 and the inlet geometry is T-shaped.
Figure 8D:
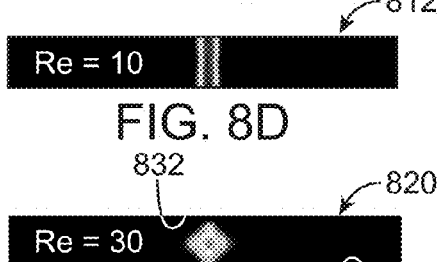
FIG. 8D is a rendering illustrating a transverse slice of a 3D combined-flow-interface pattern in the main fluidic channel of the fluidic system of FIG. 2 under conditions in which the Reynolds number is ~10 and the inlet geometry is P-shaped.
Figure 8E:
FIG. 8E is a rendering illustrating a transverse slice of a 3D combined-flow-interface pattern in the main fluidic channel of the fluidic system of FIG. 2 under conditions in which the Reynolds number is ~30 and the inlet geometry is T-shaped.
Figure 8F:
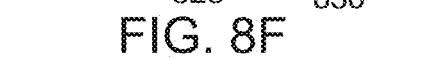
FIG. 8F is a rendering illustrating a transverse slice of a 3D combined-flow-interface pattern in the main fluidic channel of the fluidic system of FIG. 2 under conditions in which the Reynolds number is ~30 and the inlet geometry is P-shaped.

The confluence of the multiple fluid streams flowing into main fluidic channel 108 via inlets 112 from fluid-delivery system 116 results in the formation of a combined-flow interface 120 among the flows. As described below in detail, when controlled in accordance with the present invention, combined-flow interface 120 can be characterized as having a 3D-pattern that can be changed as desired to suit a particular application. The 3D-pattern of combined-flow interface 120 can be controlled to be highly concentrated and focused (such as in the diamond pattern of FIG. 8F), or highly dispersed and unfocused (such as in the pattern of FIG. 6 at a (vii) (col. (row)). In exemplary system 100, the 3D-pattern of combined-flow interface 120 is controlled using a 3D-pattern controller 124 that is designed and configured in a manner that allows a user (not shown) to select a desired 3D-pattern for combined-flow interface 120 and then controls fluid-delivery system 116 in a manner that the selected 3D-pattern is achieved within main fluidic channel 108.

As those skilled in the art will readily understand, 3D-pattern controller 124 can be implemented in any suitable hardware and/or software. Examples of hardware include general purpose computers/microprocessors, programmable logic controllers, application-specific integrated circuits, etc. Examples of software include firmware, general-purpose fluidics software programs, specific-purpose fluidics software programs, etc. In addition to being programmed to achieve a particular pattern and amount of focus, in some embodiments 3D-pattern controller 124 can be designed and configured to change the pattern and amount of focus among a plurality of predetermined patterns and amounts of focus. With some embodiments of system 100, 3D-pattern controller 124 can achieve the desired results alone, while in other embodiments, a user might have to select an appropriate multilane fluidic device for device 104. This is so because, as described below in detail, pattern and focusing results can be affected by a variety of factors concerning the configuration of multilane fluidic device 104, including the height of main fluidic channel 108, the input flow angles of inlets 112, and the distances between adjacent sets of the inlets. The switching-out of one instantiation of multilane fluidic device 104 for another can be readily accomplished using modular fluidic devices, the fabrication of which is well known in the art. Indeed, the configuration (e.g., main channel height, inlet spacing, and inlet angles) of the instantiation of multilane fluidic device 104 in use at a particular time can be an input to 3D-pattern controller 124 as parameters in the control scheme that allows the controller to properly control fluid-delivery system 116 for the desired shape. Other user-selectable parameters for the control scheme of 3D-pattern controller 124 might include, for example, the types of fluids used and their temperatures, since their densities and viscosities can affect the pattern and amount of focus of combined-flow interface 120. In one example, the control scheme includes one or more look-up tables that contain settings for controlling fluid-delivery system 116 based on system parameters input by a user.

In the example shown, 3D-pattern controller 124 implements a control scheme that utilizes information from one or more sensors 128, each in operative relation to main fluidic channel 108 and/or the fluids flowing therein during operation, to control fluid-delivery system 116 in a manner that achieves the desired pattern and amount of focus of flow interface 120. In one example, sensor 128 is an imaging sensor (optical or other) that obtains images of (or images representing) combined-flow interface 120. When sensor 128 is an imaging sensor, the control scheme of 3D-pattern controller 124 can include stored images of selected pattern/focus combinations and image-analysis and control algorithms that compare a current image to one or more of the stored images and determine any adjustments that might need to be made to fluid-delivery system 116 to achieve the desired pattern and amount of focus of combined-flow interface 120. Other embodiments may utilize an imaging sensor in another way, such as to provide visual information to a human user, who then can make adjustments to fluid-delivery system 116 using any of a variety of user-input controls, such as soft controls of a graphical user interface of 3D-pattern controller 124 or hard controls of the controller and/or any of the pieces of equipment of the fluid delivery system.

Three-Lane Fluidic Device Example
Experimental Setup

Figure 2:
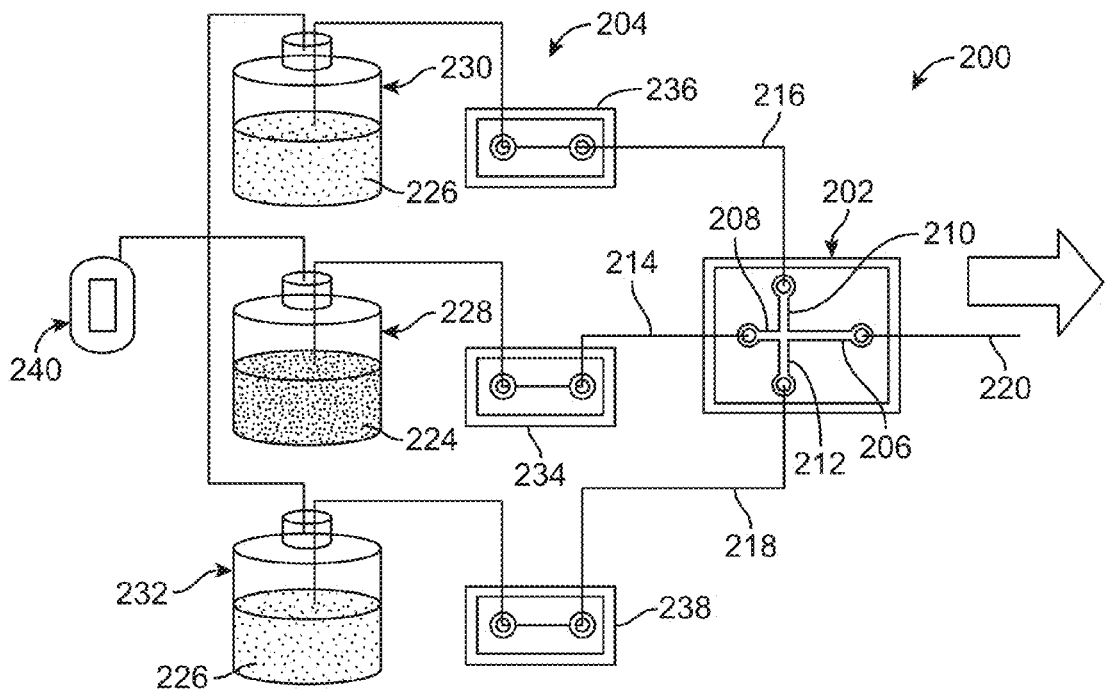
FIG. 2 is a schematic diagram of an exemplary embodiment of the fluidic system of FIG. 1, wherein the multilane fluidic device is a three-lane fluidic module having a T-shaped lateral inlet configuration.
Figure 3A:
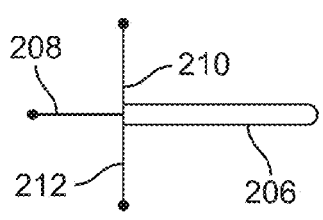
FIG. 3A is an enlarged plan view of the three-lane fluidic module of the system of FIG. 2.
Figure 3B:
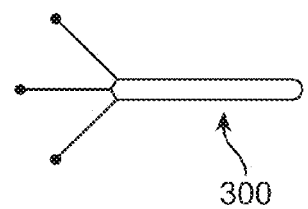
FIG. 3B is a plan view of a three-lane fluidic module having a Y-shaped lateral inlet configuration.
Figure 3C:
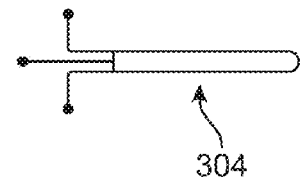
FIG. 3C is a plan view of a three-lane fluidic module having a parallel, or "P" type, lateral inlet configuration.

FIGS. 2 through 4B illustrate a modular fluidic system 200 that is a specific instantiation of fluidic system 100 of FIG. 1 and that was used to demonstrate successful implementation of pattern and focus control schemes disclosed herein. Referring to FIG. 2, modular fluidic system 200 includes a three-lane fluidic network module 202 and a three-reservoir fluid-delivery system 204 for supplying the fluids to the fluidic network module. Fluidic module network 202 has a main fluidic channel 206 and a central inlet 208 and first and second lateral inlets 210 and 212 for communicating three fluid streams 214, 216, and 218 into the main fluidic channel. As used herein and in the appended claims, the term "lateral" denotes the location of item modified by that term relative to a central inlet or inlet(s), as the case may be. In this example, fluidic module 202 is referred to as having a "T-shaped" configuration because lateral inlets 210 and 212 deliver their fluid streams 216 and 218 to main fluidic channel 206 in a direction perpendicular to the longitudinal axis 220 of the main fluidic channel. FIG. 3A illustrates main fluidic channel 206 and inlets 208, 210, and 212 in a bit more detail with regard to their relative physical dimensions. It is noted that while fluidic network module 202 is shown as having a T-shaped lateral inlet configuration, other configurations of lateral inlets are possible, such as the Y-shaped configuration 300 shown in FIG. 3B and the parallel configuration 304 shown in FIG. 3C that were used to achieve some of the results described below.

FIGS. 4A and 4B show fluidic network module 202 in even further detail, in part to give the reader a sense of the experimental results described below. As seen in FIG. 4A, a scanning head 400 of a confocal microscopy system (not shown) is located in an inverted manner beneath main fluidic channel 206 of network module 202. In the results presented below, this confocal microscopy system was used to make images of flow interface (not shown) that forms within main fluidic channel 206. It is noted that the confocal microscopy system could also be used in an imaging feedback roll, such as in the example of sensor 128 described above relative to FIG. 1. As seen in FIG. 4B, the image capture range 404 of the confocal microscopy system for this instantiation of fluidic network module 202 is approximately 1.5 mm×1.5 mm×300 µm, with the 300 µm dimension being split into sixty 5-µm-thick sections.

Referring again to FIG. 2, fluid-delivery system 204 is set up for delivering a maximum of three different fluids to fluidic network module 202. However, it is noted that the experimental results reported below were achieved using two different fluids, a first fluid 224 for central inlet 208 and a second, different fluid 226 for lateral inlets 210 and 212. Fluid-delivery system 204 includes three reservoirs 228, 230, and 232 in fluid communication with, respectively, central and lateral inlets 208, 210, and 212, through corresponding respective fluidic-resistor modules 234, 236, and 238. Fluid-delivery system 204 utilizes a compressed gas system 240 for driving fluid streams 214, 216, and 218 into main fluidic channel 206. Since in this example, reservoirs 228, 230, and 232, and hence, fluids 224 and 226 in them, are under the same pressure from compressed gas system 240, the mass flow rates of streams 214, 216, and 218 are set using resistor modules 234, 236, and 238 of specific fluidic-resistance values and can be changed by swapping out one or more of the resistor modules with modules of different resistance values. It is noted that in the experimental setup, fluidic network module 202 and each of resistor modules 234, 236, and 238 were conventional-2D-style microfluidic modules.

Experimental Methods

To demonstrate the utility of methods and systems disclosed herein, various instantiations of fluidic system 200 of FIGS. 2 through 4B were assembled and tested. The instantiations of microfluidic resistor modules 234, 236, and 238 used represented combinations of three resistances and three chamber sizes, with the combinations denoted R10-200x50, R20-200x50, and R60-200x50. For example, in the first designation, i.e., R10-200x50, the resistance length of the channel was 10 mm, and the rectangular cross-section were 200 µm wide and 50 µm high. The instantiations of main fluidic channel 206 were configured with each of the three inlets 208, 210, and 212 having rectangular transverse (to the flow of the respective fluid stream 214, 216, and 218) cross-sections that were 200 μm wide, 200 μm high (150 μm high for the P-channel), and 5 mm long. Inlets 208, 210, and 212 converged to form main fluidic channel 206 having a rectangular transverse (generally, to the combined flow in the main channel) cross-section that was 1.500 mm wide, 200 μm high (150 μm high for the P-channel), and 10 mm long. Reservoirs 228, 230, and 232 were connected to microfluidic resistor modules 234, 236, and 238 using silicone tubing that had a 0.8 mm inner diameter (ABW00001, Fisher Scientific, Pittsburgh, Pa.). Microfluidic resistor modules 234, 236, and 238 and each instantiation of main fluidic channel 206 were connected using polyethylene tubing of 0.76 mm inner diameter (INTRAMEDIC™, 427416, Becton Dickinson and Company, Sparks, Md.). The tubing sections between microfluidic resistor modules 234, 236, and 238 and each instantiation of main fluidic channel 206 were approximately 200 mm long.

Microfluidic resistor modules 234, 236, and 238 and each instantiation of fluidic network module 202 were fabricated from polydimethylsiloxane (PDMS) (SYLGARD® 184, Dow Corning, Midland, Mich.) using soft-lithography techniques. Briefly, two dimensional patterns of modular microfluidic channels were transferred to a high-resolution transparency. Fabrication of master templates for PDMS molds was performed by patterning desired-height layers of negative SU-8 photoresist (MicroChem Corp., Newton, Mass.) on silicon wafers. After exposure to UV light and chemical developing, the wafers were used as the master templates to create the PDMS microchannels. Treatment of both surfaces of the PDMS channels and thin glass coverslides was with oxygen plasma.

Aqueous fluorescent beads [FLUOSPHERES® (0.2 μm) red fluorescent (580/605), Introgen, Carlsbad, Calif.] were suspended in reservoir 228 for first fluid 224 delivered to central inlet 208. Single planar images and z-series stacks of planar images within main fluidic channel 206 were collected using confocal laser scanning head 400 (FIG. 4A) (SP5, Leica Microsystems, Bannockburn, Ill.) mounted on an inverted compound microscope (DMI6000, Leica Microsystems) (not shown) with image acquisition software (LASAF, Leica Microsystems). Maximum projection and re-slicing of z-series stacks and collection of intensity profiles were completed using IMAGEJ® (v.1.38, Wayne Rasband, NIH) and MATLAB® (The MathWorks, Natick, Mass.) software.

Numerical simulations of the flow field were made using the commercial CFD solver, FLUENT® (ANSYS Inc., Lebanon, N.H.) in order to solve the non-linear Navier-Stokes equations governing the conservation of mass and momentum within the fluid elements. Advection-diffusion equations were also solved to predict the flow field and the user-defined scalar species. The diffusion coefficients for the scalar species were specified to be 2.27e-10 m²/s corresponding to that of water at approximately room temperature. The experiments assumed a Newtonian fluid having the properties of water at room temperature and no-slip boundary conditions on all the walls. The 3D computational domain was built using a structured hexahedral mesh with most of the cells having sides of 15 μm and four boundary layers (5~10 μm) near the walls of the respective flow channels. Mesh independence was verified by examining higher density meshes. The SIMPLE algorithm was implemented for pressure-velocity coupling and all spatial discretizations were performed using the Second Order Upwind scheme. The convergence limit was set so that velocities converged within 0.1% and mass fractions for the central stream species reached their asymptotic values within 0.01%.

During the experiments, fluidic system 200 used compressed air as the pressure source, and the compressed air provided a constant pressure to each of the three reservoirs 228, 230, and 232. Reservoir 228 held a diluted suspension of fluorescent beads (FLUOSPHERES® (0.2 μm), Introgen, Carlsbad, Calif.) (i.e., first fluid 224), and the other two reservoirs 230 and 232 held de-ionized water (i.e., second fluid 226). During the experiments, fluids 224 and 226 from the three reservoirs 228, 230, and 232 passed through the specified fluidic resistor modules 234, 236, and 238 before entering the various instantiations of main fluidic channel 206 as streams 214, 216, and 218. The flow of the three fluid streams 214, 216, and 218 converged in main fluidic channel 206 and formed a microfluidic interface among the streams.

During the experiments, the pressure of the compressed air was controlled to control the flow rates of first and second fluids 224 and 226 according to the following Equation 1:

$$Q = \frac{\Delta P}{R} \quad \{1\}$$

wherein Q is the flow rate, $\Delta P$ is the pressure drop in the network, and R is the fluidic resistance at each inlet. The following Equation 2 shows how the fluidic resistance R relates to the dimensions of main fluidic channel 206.

$$R = \frac{12\mu L}{wh^3}\left[1 - \frac{h}{w}\left(\frac{192}{\pi^5}\sum_{n=1,3,5}^{\infty}\frac{1}{n^5}\tanh\left(\frac{n\pi w}{2h}\right)\right)\right]^{-1} \quad \{2\}$$

wherein μ represents the fluid's kinetic viscosity; w, h, and L represent the channel width, height, and length, respectively. This flow rate was used to approximate the Reynolds number (Re) using the following Equation 3.

$$Re = \frac{\rho U D_h}{\mu} = \frac{\rho U}{\mu}\frac{2wh}{w+h} = \frac{\rho}{\mu}\frac{2Q}{w+h} \quad \{3\}$$

wherein ρ represents the fluid's density; U represents the fluid's average velocity. FIG. 5 is a graph 500 showing the flow rate and the Reynolds number, which were calculated using Equations 1, 2, and 3, above, from the pressure applied in the experiments. The circles represent the flow rate. The crosses, triangles, and squares represent the Reynolds number for channel heights of 300 μm, 200 μm, and 100 μm, respectively. The slope of the flow rate with respect to the pressure represents the equivalent fluidic resistance.

To be able to have control over the resulting 3D combined-flow interface patterns, a novel phenomenon that occurs in the middle range of Reynolds numbers is exploited. In the context of the size regime of the experimental instantiations of main fluidic channel 206, this middle range is ~10<Re<~30. However, for other size regimes, the middle range is different. For example, for larger channel size regimes, middle ranges extending up to Re=100 may be appropriate. The 3D-pattern response is important as it is outside the range for typical microfluidics showing linear and vertical fluidic interface patterns (see, e.g., FIG. 6. at a(i) (col.(row)) and for regions Where passive mixing occurs due to relatively important inertial force (see, e.g., FIG. 6 at a(iv)). This middle range may have been considered to be an undefined transition zone from typical microfluidic area (Re<~1.0) to chaotic mixing zone (Re>~70) because there may not have been any special characteristics previously found in this range. The relative importance though is due to the increase of inertial forces relative to viscous force. The present disclosure demonstrates, however, that with manipulation of the inlet geometry, this Reynolds number range can be defined as a new class for creating 3D combined-flow-interface patterns without chaotic mixing. Furthermore, this 3D-pattern is readily and precisely predictable using CFD simulations.

Experimental Results

Figure 6:
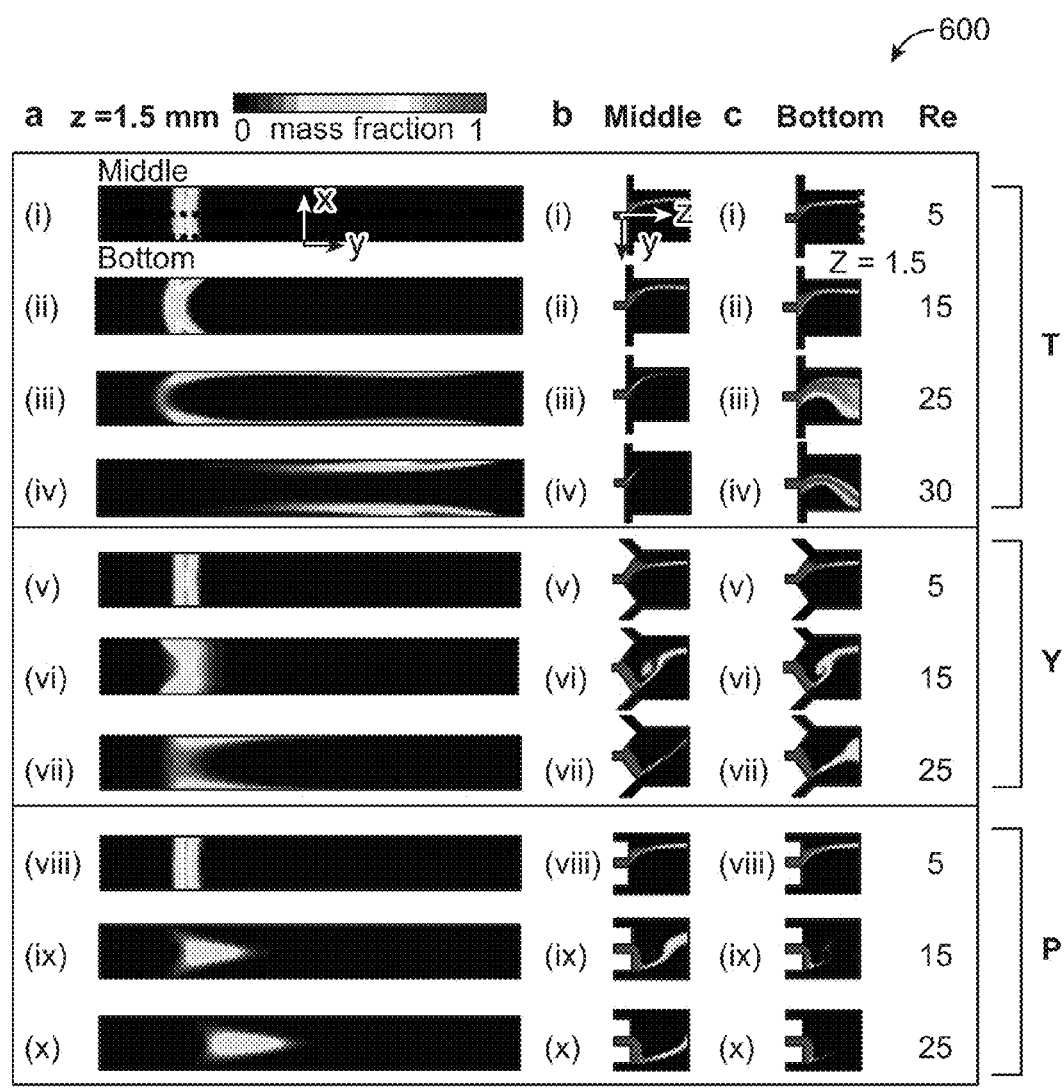
FIG. 6 is a table of renderings illustrating transverse and longitudinal slices of 3D combined-flow-interface patterns achieved during experiments using the fluidic system of FIG. 2, illustrating effects on the 3D-patterns of differing lateral inlet configurations and differing Reynolds numbers.

Control over the 3D combined-flow-interface patterns is achieved in this example by manipulating three parameters: Reynolds number, channel height, and inlet geometry. Table 600 of FIG. 6 shows the formed 3D combined-flow-interface patterns using a fixed height (200 μm) for main fluidic channel 206 with varying Reynolds number and inlet geometry. Central stream 212 is nearly vertical and planar from the top to the bottom boundaries in each of the T- Y- and P-inlet geometries at low Reynolds number (~5), as shown in FIG. 6 at a(i), a(v), and a(viii), respectively.

When the Reynolds number increases to 25, the pattern of central stream 212 becomes intensively curved, and 3D, at the upper and bottom walls in the T- and Y-inlet geometries, as shown in FIG. 6 at a(iii) and a(vi)), respectively, but mainly floats above the wall in the P-channel, as shown in FIG. 6 at a(ix) and a(x). The 2D flow patterns in the middle section (FIG. 6 at b) and the bottom (FIG. 6 at c) view of main fluidic channel 206 help to elucidate how these 3D unique shapes form as the Reynolds number increases. The distribution at the middle section can be significantly different from at the bottom view. For example, for the T-inlet geometry at Re~25, the distribution in the middle is narrow (FIG. 6 at b(iii)), while the distribution is extremely broad with much greater curvature for the bottom view (FIG. 6 at c(iii)). This observation correlated well with the experimental results as the pattern formation appears to be correlated to two points: (1) the vortex formation near the entrance region of the central stream; and (2) the fluid momentum differentials of the parabolic velocity profile.

The shape type depends on inlet geometry, (e.g. the amount of fluid momentum introduced from the side inlet channels). The significant pattern changes are even more obvious in the Y-inlet geometry as the pattern appears to be partially floating at Re~15 (FIG. 6 at a(vi)), but curved at the walls at Re~25 (FIG. 6 at a(vii)). This tremendous change occurs with only a small change in parameters within the same inlet geometry.

One reason that this considerable transition occurs is due to the flow momentum in the Y-inlet geometry, which has characteristics of the flow with both the T- and P-inlet geometries, the Y-inlet geometry is an intermediate between the T- and P-inlet geometry. In addition, the flow patterns shaping the vortex in the Y-inlet geometry appear similar to the patterns in the P-inlet geometry in the entrance region before the fluid flow reaches the entrance length. In downstream regions, they tend to follow the patterns in the T-inlet geometry. For example, FIG. 6, at b(vi) and c(vi), shows the vortex formation near inlet 208 of central stream 214, while at b(vii) and c(vii) shows the separation at inlet 210 of fluid stream 216 (FIG. 2).

When the Reynolds number reaches 30 in the T-inlet geometry, central stream 214 and its interface with lateral streams 216 and 218 no longer exist. Instead, the combined-flow-interface pattern was found at the top and bottom of main fluidic channel 206 as well as having moved to the other side, creating secondary flow from increased inertial forces of the flowing fluid. This secondary flow is not observed in the Y- and P-inlet geometries at the same Reynolds number, but complicated secondary flow induces complex mixing patterns at higher Reynolds number (~70 in this size regime).

Figure 7A:
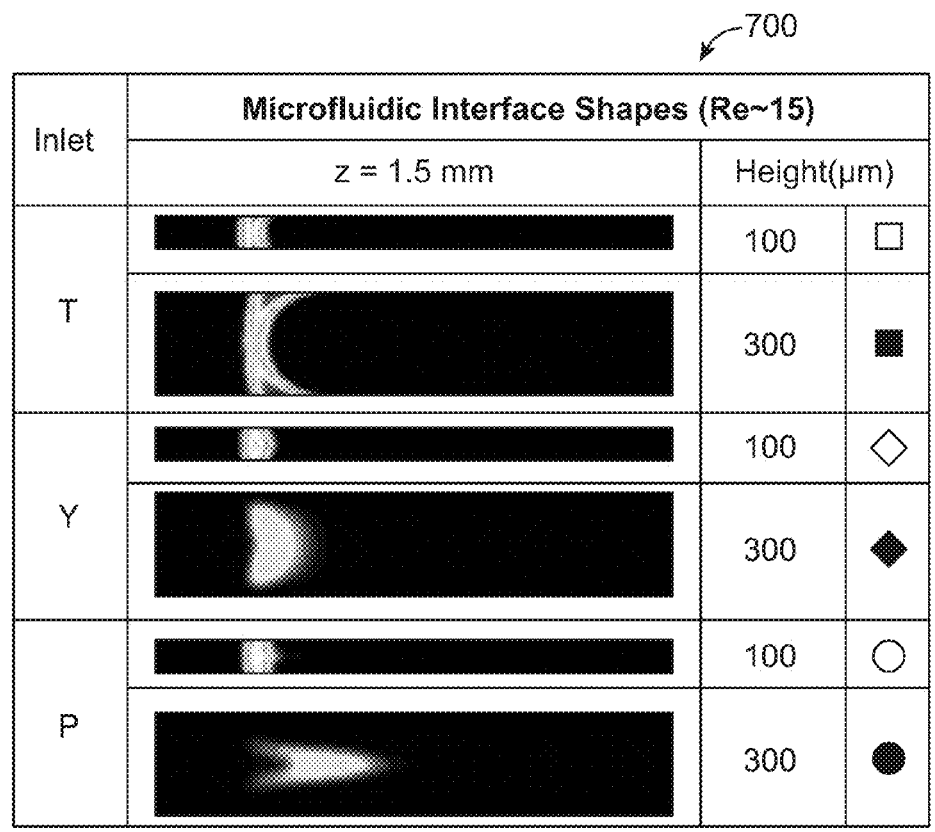
FIG. 7A is a table of renderings illustrating transverse slices of 3D combined-flow-interface patterns achieved during experiments using the fluidic system of FIG. 2, illustrating effects on the 3D patterns of differing lateral inlet configurations and differing heights of the main fluidic channel.
Figure 7B:
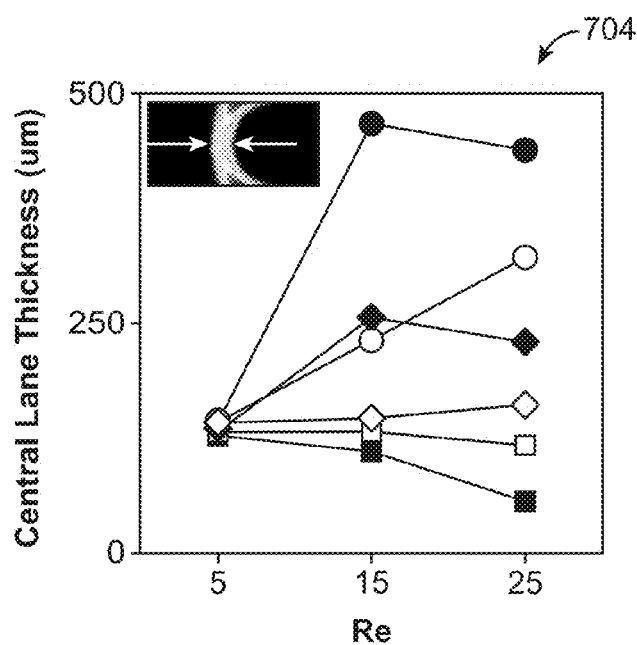
FIG. 7B is a graph of central lane thickness versus Reynolds number, wherein the filled and unfilled geometric shapes in the graph correspond to differing channel heights and lateral inlet geometries as indicated in FIG. 7A.

A second parameter manipulated in accordance with the present invention in the experiments with fluidic system 200 to achieve desired 3D combined-flow-interface patterns was the channel height in the microfluidic network. The effect of alteration of the pattern related to channel height (100 μm, 200 μm, and 300 μm) was illustrated in FIG. 7A. Referring to FIG. 7A, table 700 shows that at Re~15, the shape of the 3D-pattern is nearly vertical with height even with the channel height of 100 μm. In table 700, the 3D-pattern becomes intensely curved or floating when the channel height is increased to 300 μm, even with the Reynolds number remaining at ~15. This distribution though is not so obvious. The central lane thickness, shown in graph 704 of FIG. 7B, indicates that the thickness in the central profile in the higher P-inlet-geometry channels becomes broader with increasing Reynolds number, but then much thinner for the higher T-inlet geometry-channels. This sensitivity to channel height is critical, as relatively larger microfluidic systems with dimensions of hundreds of microns to multiple millimeters are becoming of interest in application areas including model organism behaviors in microfluidics, embryonic development, optofluidics, and passive mixing.

Figure 7C:
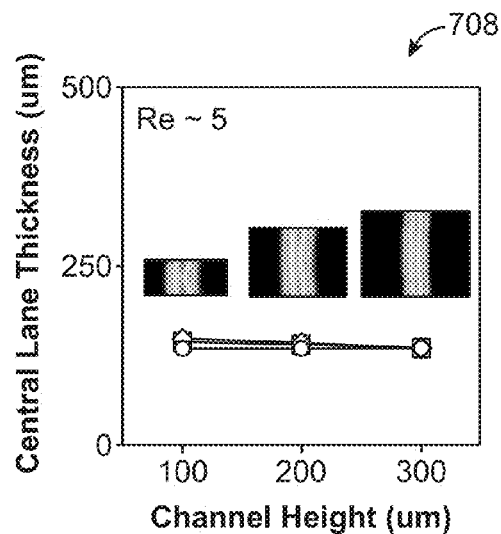
FIG. 7C is a graph of central lane thickness versus channel eight for Reynolds number ~5 for experiments conducted using the fluidic system of FIG. 2.
Figure 7D:
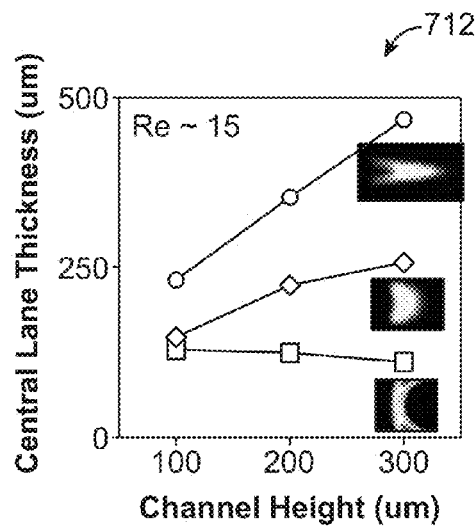
FIG. 7D is a graph of central lane thickness versus channel height for Reynolds number ~15 for experiments conducted using the fluidic system of FIG. 2.
Figure 7E:
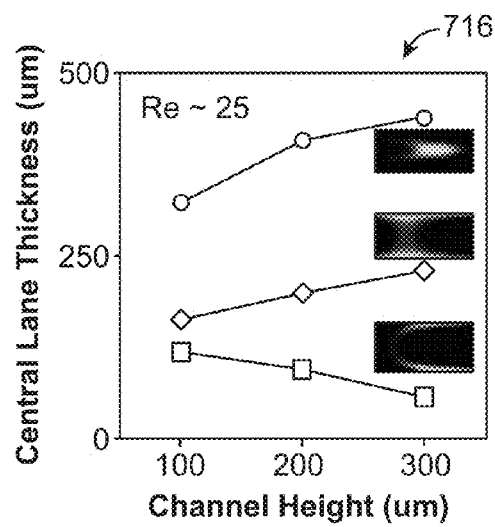
FIG. 7E is a graph of central lane thickness versus channel height for Reynolds number ~25 for experiments conducted using the fluidic system of FIG. 2.

The sensitivities of the combined-flow-interface pattern to channel height are shown in graphs 708, 712, and 716 of FIGS. 7C, 7D, and 7E, respectively. The thickness of the combined-flow-interface pattern is nearly the same over the range of channel height at relatively low Reynolds number (~5), as in table 708 FIG. 7C, but is significantly different at Re~15 (table 712 of FIG. 7D) and at Re~25 (table 716 of FIG. 7E). This same tendency for the resultant combined-flow-interface pattern to change is related to the specific channel inlet geometries as well. As the channel height and Reynolds number increases, the sensitivity of the 3D-patterns also increases to a great extent. The resulting forms are also very dependent on the channel inlet geometry.

The need for fluidic channels with sizes that are larger than traditional microfluidic channels in the range of hundreds of microns to single millimeters has been considered for exploring novel fields such as model organism behavior, embryonic development, multicellular stimulation, mixing layers, and chemical fabrication approaches. The sensitivity of combined-flow-interface patterns to the channel height described here (FIGS. 7A-E) can be applied to control and manipulate a variety of 3D-patterns for these new applications without repeated fabrication and demonstration of complicated multilayer microfluidic network as done in the prior art.

The simple 2D approach of the present example for scaling up fluidics using microfluidic modules and autonomous flow control is more versatile and less expensive for 3D combined-flow-interface patterning than other techniques that may or may not be able to generate the chemical pattern profiles that are achievable through the use of the methods of the present invention. These prior art methods include complex and multi-layered microfluidic architectures. Through using 2D resistor modules (with the same cross section), the control of the fluidic network can be implemented by simply calculating the flow rate and pressure relations. They are thus independent of the main channel, which allows a tremendous amount of flexibility for frequent redesigned for various applications and experimental specifications.

The ability to not only create but also alter and focus the 3D-patterns was also demonstrated in the experiments. The patterns are essentially inverted in some cases. The combined flow interface patterns at low Reynolds number (~10 for the current size regime) in T- and P-inlet geometries (renderings 800 and 804 of FIGS. 8A and 8B, respectively, show central stream patterns aligning along the upper and lower boundaries with interfaces at the center of the y-axis, as seen in renderings 808 and 812 of FIGS. 8C and 8D, respectively. The focus of the 3D-pattern is changed by simply altering the Reynolds number (~30) in the channels, as seen in renderings 816 and 820 of FIGS. 8E and 8F, respectively.

Figure 10A:
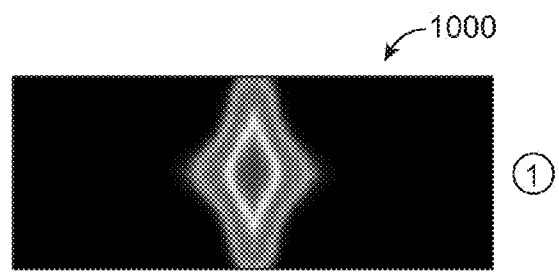
FIG. 10A is a rendering illustrating a transverse slice of a 3D combined-flow-interface pattern formed within the main fluidic channel of the five-lane system of FIGS. 9A-B.
Figure 10B:
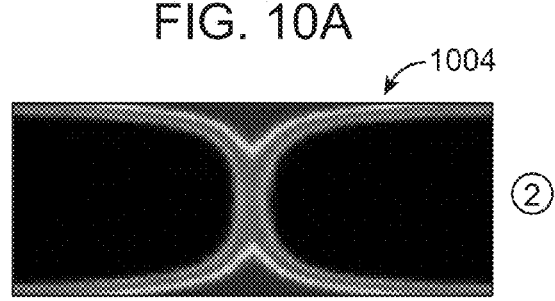
FIG. 10B is a rendering illustrating a transverse slice of another 3D combined-flow-interface pattern formed within the main fluidic channel of the five-lane fluidic system of FIGS. 9A-B.
Figure 10C:
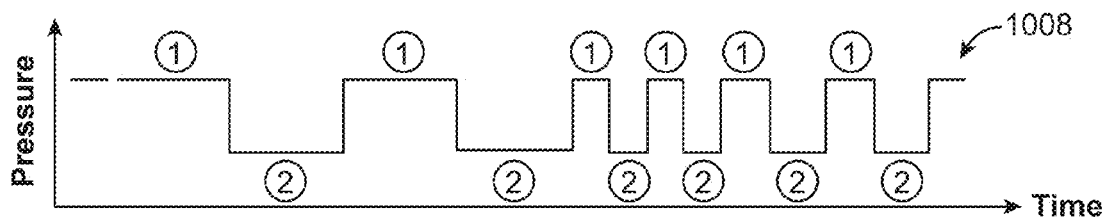
FIG. 10C is a graph of pressure versus time for the pressure in one of the flow streams during experiments using the five-lane fluidic system of FIGS. 9A-B.

The tornado-like pattern 824 of central stream 214 in the T-inlet geometry (FIG. 8E) is focused into a floating diamond pattern 828 (FIG. 8F) centered around the middle of the x- and y-axes in the P-inlet geometry at the same Reynolds number (~30). This 3D floating diamond pattern 828 (FIG. 8F) lacks any pattern at the upper and lower boundaries 832 and 836, respectively of main fluidic channel 206 (+x and −x) versus previously where tornado-like pattern 824 (FIG. 8E) was mainly concentrated along these upper and lower boundaries. Diverse pattern alterations were investigated through CM simulation with varying channel geometry and Reynolds number for three different channel heights of 100 μm, 200 μm, and 300 μm. The resulting forms are very dependent on the channel inlet geometry. The 3D-patterns were drastically changed as the channel height increases at Re~15 with very prominent focusing observed. Further experimental results can be found in FIGS. 5, 10, and 11 and in the written description portion of the above-referenced provisional patent application, which is incorporated by reference herein for its disclosure and discussions of the experimental results.

Five-Lane Fluidic Device Example
Experimental Setup

Figure 9A:
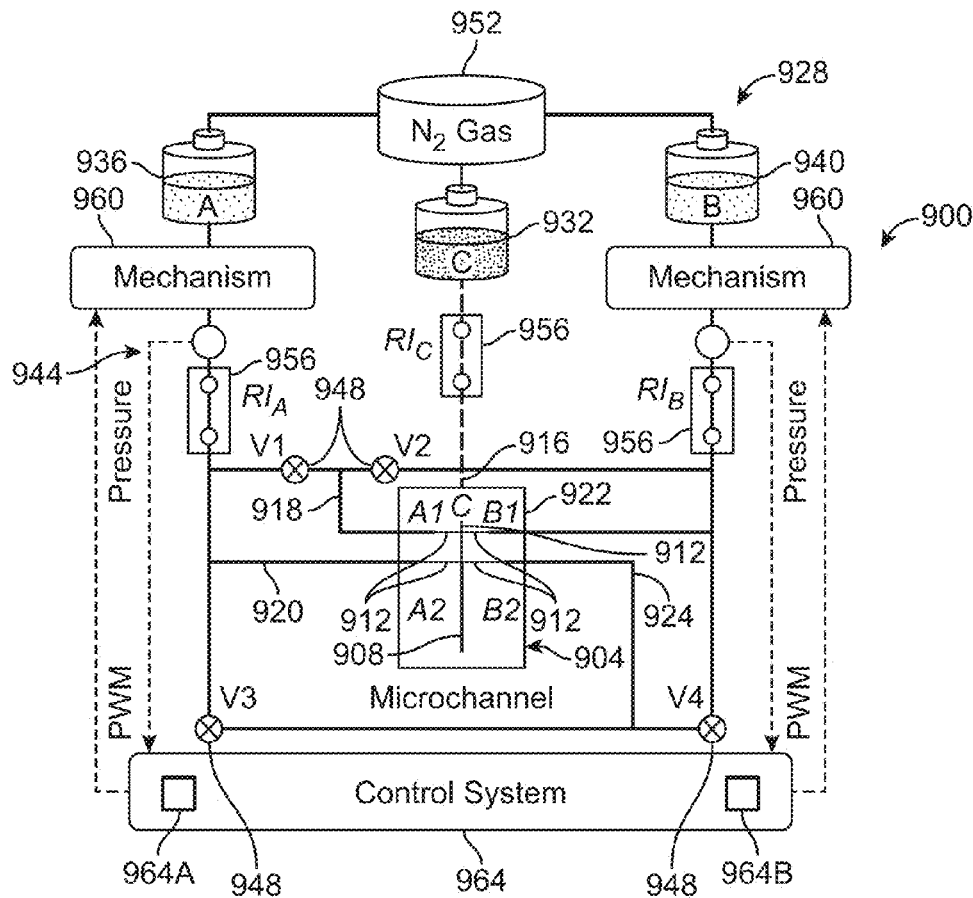
FIG. 9A is a schematic diagram of an exemplary embodiment of the fluidic system of FIG. 1, wherein the multilane fluidic device is a five-lane fluidic module having both T-shaped and P-shaped lateral inlet configurations.
Figure 9B:
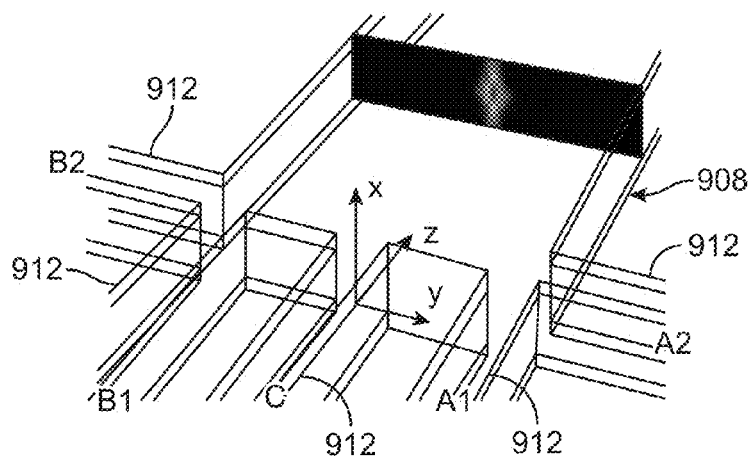
FIG. 9B is an enlarged diagram of the five-lane fluidic module of FIG. 9A showing the inlet configuration, coordinate system and a slice of a 3D combined-flow-interface pattern formed within the main fluidic channel of the module.

FIGS. 9A and 9B illustrate a five-lane fluidic system 900 used to conduct a series of experiments, some of which are described below in connection with FIGS. 10A through 13B. Referring to FIGS. 9A and 9B, system 900 includes a five-lane microchannel module 904 that includes a main fluidic channel 908 and five inlets 912 (also labeled and referred to individually below as C, A1, A2, B1, and B2) that provide five corresponding respective fluid streams 916 through 924 to the main fluidic channel. Inlet C is denoted as a central inlet and inlets A1 and A2 are denoted as lateral inlets, as are inlets B1 and B2, which are on the opposite side of central inlet C relative to lateral inlets A1 and A2. Lateral inlets A1 and B1 have a P-inlet geometry (i.e., have a flow axis parallel to the flow axis of central inlet C, and lateral inlets A2 and B2 have a T-inlet geometry. As described below in connection with the experimental methods and results, the relative pressures in the same-side lateral inlets (i.e., A1 & A2 and B1 & B2) allow a user to control the pattern of the combined flow of the corresponding flow streams (i.e., streams 918 & 920 and 922 & 924) to effectively control the virtual inlet angle of the combined streams. For example, by adjusting the flow rates of streams 918 (P-inlet geometry) and 920 (T-inlet geometry), the user can effectively simulate a Y-inlet geometry inlet flow. As seen below, this allows for very fine control of the 3D combined-flow-interface patterns and eliminates the need to swap-out main-channel fluidic modules, as needs to be done in the 3-lane example of FIG. 2.

System 900 also includes a fluid-delivery system 928 having three reservoirs 932, 936, and 940 (also referred to below in the experimental methods and results section as reservoirs C (central), A, and B, respectively). Reservoir 932 (C) is the source of fluid stream 916, and reservoirs 936 (A) and 940 (B) provide their respective fluids to a fluid channel network 944 containing a number of valves 948 (also labeled and referred to below individually as V1 through V4). Fluid-delivery system 928 also has a pressure source 952 (here a nitrogen gas source) fluidly connected to each of reservoirs 932, 936, and 940 to provide the driving pressure that drives the flow of streams 916 through 924. Fluid-delivery system 928 also has three fluidic resistor modules 956 connected downstream of reservoirs 932, 936, and 940. In the following description of the experimental methods and results section, fluidic resistor modules 956 are individually referred to as modules $RI_A$, $RI_B$, and $RI_C$. In addition, this instantiation of fluid-delivery system 928 include two like flow-control mechanisms 960 that control the mass flow rates of the fluids from reservoirs 936 (A) and 940 (B). A 3D-pattern controller 964 is provided for controlling flow-control mechanism 960. Further details of the components of fluidic system 900 are described immediately below.

Three-dimensional pattern controller 964 includes closed-loop control systems 964A and 964B that regulated the pressure at inlets A1, A2, B1, and B2 to main fluidic channel 908. Control systems 964A and 964B were integrated with a PIC MICRO® 18F4620 micro-controller (Microchip Technology Inc., Farmington Hills, Mich.) at a sampling rate of 125 Hz. The sampling rate was determined by the maximum response time (8 milliseconds) of the piezoelectric gauge pressure sensor (ASDX series, Honeywell International Inc., Morristown, N.J.). This micro-controller sent pulse-width-modulation (PWM) signals and regulated the angle of the direct-current (DC) electric motor through an encoder with a resolution of 512 counts per revolution.

Microfluidic resistor modules $RI_A$, $RI_B$, and $RI_C$ of differing resistances were designed to determine the width of the central fluid stream in the main microfluidic channel as well as set the dynamic range of the controllable pressure. The main microfluidic channel had five inlet channels leading to inlets 912, each having a rectangular configuration of dimensions 200 mm wide, 300 mm high, and 5 mm long. These inlet channels converged to form main fluidic channel 908 of rectangular configuration with dimensions 1.5 mm (1500 microns) wide, 300 microns (0.3 mm) high, and 10 mm long. Microfluidic resistance modules $RI_A$, $RI_B$, and $RI_C$ and main fluidic channel 908 were fabricated with PDMS (SYLGARD 184, Dow Corning, Midland, Mich.) using standard soft-lithography techniques.

Fluorescent beads [FluoSpheres (0.2 mm) red fluorescent (580/605), Introgen, Carlsbad, Calif.] were suspended in deionized water and then introduced into reservoir 932 for central inlet C. Single plane images and z-series stacks of image planes within the microfluidic channel were captured using a confocal laser scanning head (not shown, but located beneath main fluidic channel 908) (SP5, Leica Microsystems, Bannockburn, Ill.) mounted on an inverted compound microscope (DMI6000, Leica Microsystems), with image acquisition software (LAS AF, Leica Microsystems). Maximum projection and re-slicing of z-series stacks and collection of intensity profiles were completed using IMAGEJ® (v.1.38, Wayne Rasband, NIH) and MATLAB® (The Math Works, Natick, Mass.) software.

Numerical simulations of the flow field were conducted using the commercial CFI) solver, FLUENT® (ANSYS Inc., Lebanon, N.H.) in order to solve the non-linear Navier—Stokes equations governing the conservation of mass and momentum within the fluid elements. Advection—diffusion equations were also solved to predict the flow field and the user-defined scalar species. The diffusion coefficients for the scalar species used in the simulations were assumed to be $2.2 \times 10^{-1}$ $m^2 s^{-1}$ corresponding to that of water at approximately room temperature. A Newtonian fluid having the properties of water at room temperature and no-slip boundary conditions on all the walls was assumed. Mesh independence was verified by examining higher density meshes. The SIMPLE algorithm was implemented for pressure-velocity coupling, and all spatial discretizations were performed using the Second Order Upwind scheme. Flow rates were specified at all inlets 912 that were correlated to the applied inlet pressures in the experiments along with using atmospheric pressure at the outlet of main fluidic channel 908. Convergence limits were set so that velocities converged within 0.1% and mass fractions for the central stream species reached their asymptotic values within 0.01%.

Experimental Methods and Results

Three-dimensional combined-flow-interface patterns were first switched in main-fluidic-channel-based single 2D microfluidic platform by controlling the pressure at the microchannel inlets 912. The implemented approach dynamically switched between different 3D-patterns, such as the focused diamond pattern 1000 of FIG. 10A and the defocused hour glass shape 1004 of FIG. 10B by simply changing the inlet pressures as illustrated in the dynamic response 1008 of FIG. 10C. This dynamic response 1008 was controlled by switching the pressure signals back and forth from a higher pressure of 48.0 kPa ($\hat{1}$) (focused pattern) to a lower pressure of 9.5 kPa ($\hat{2}$) (defocused pattern) over differing time periods. These experimental findings were confirmed by using CFD simulations. Confocal microscopy was used to capture images of the 3D-patterns in the main fluidic channel 908 (FIGS. 9A-B) at vertical (x-axis) intervals of 5 mm to generate 60 image stacks spanning a range of 300 mm in height (x-axis) over a cross-section of 1.5×1.5 mm. The cross-section of the patterns could be determined at locations along the length of the main channels, and 3D-patterns 1000 and 1004 occurred at a location 1.3 mm (z-axis) downstream from the point at which all 5 inlets 912 (A1, A2, B1, B2, and C) converged.

Fluidic system 900 utilized compressed nitrogen gas as pressure source 952, one reservoir C with a diluted suspension of fluorescent beads, the other two reservoirs A and B with deionized water, three microfluidic resistor modules $RI_A$, $RI_B$, and $RI_C$, and a 5-lane converging microfluidic module 904. Fluidic resistor modules $RI_A$, $RI_B$, and $RI_C$ determined the dynamic range of the pressure in fluid streams 916 through 924 from three reservoirs A, B, and C and set the width of the central stream (C) in the main microfluidic channel.

As mentioned above, the two identical pressure modulation mechanisms 960 located correspondingly respectively between reservoirs A and B and the main fluidic channel 908 dynamically controlled the pressures at the microfluidic inlets 912. In this embodiment, mechanisms 960 employed a variable fluidic resistance and a variable-volume reservoir, which were mechanically coupled by a 4-bar linkage driven by a DC motor. An example of such mechanisms is described in U.S. patent application Ser. No. 12/841,743 filed on Jul. 22, 2010, and titled "Fluid-Pressure Regulator And Related Methods And System," which is incorporated herein for its disclosure of same. Four valves 948 provided the ability to modify the route of fluid flow from reservoirs A and B to channel inlets (A1, A2, B1, and B2) with reservoir A being correlated to A1 and A2 and reservoir B in FIG. 9A being correlated to B1 and B2. This arrangement allowed the pattern switching when the valves V1 and V4 are closed and V2 and V3 are open as well as the movement of the pattern from side to side in the channel when the valves V1 and V4 are open and V2 and V3 are closed.

Figure 11A:
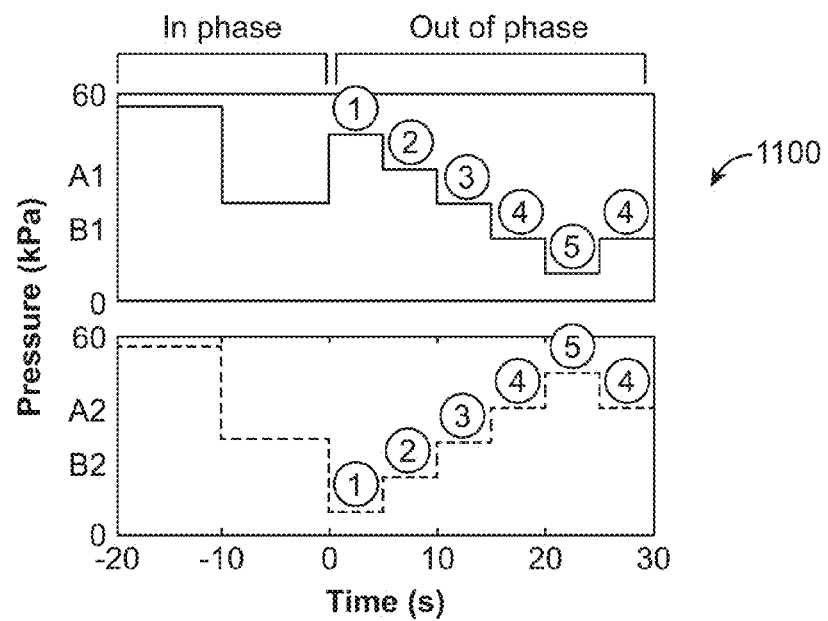
FIG. 11A is a combined graph of pressure versus time for the parallel lateral inlet flows (upper panel) and for the perpendicular lateral inlet flows (lower panel) applied during an experiment using the fluidic system of FIGS. 9A-B.
Figure 11B:
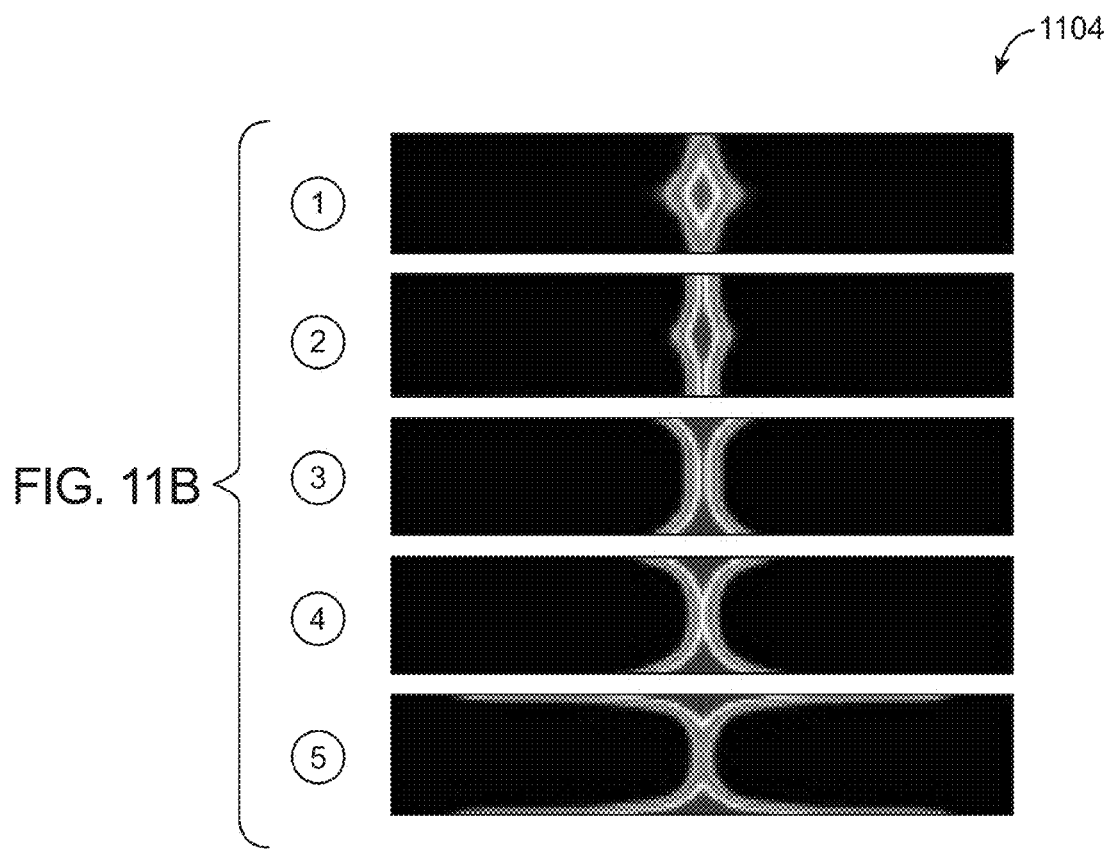
FIG. 11B is a table of renderings illustrating transverse slices of 3D combined-flow-interface patterns achieved during the controlled-pressures illustrated in the combined graph of FIG. 11A.

We next demonstrated our ability to controllably focus and defocus 3D combined-flow-interface patterns through precisely controlling the inlet pressure "in phase" (i.e. applying the same pressure levels to sets of inlets) and then altering the same sets to be "out of phase" (i.e. through simultaneously decreasing versus increasing pressure levels in the sets of inlets in a stepwise methodology). The sets of inlets were A1 and B1 (denoted as "parallel inlets") and A2 and B2 (denoted as "perpendicular inlets"). By altering the inlet pressures in a step-wise manner as illustrated in combined graph 1100 of FIG. 11A, we showed the ability to change 3D-patterns from focused to defocused over about 25 seconds. The corresponding 3D-patterns 1104 are shown in FIG. 11B and are labeled according to the labeling in combined graph 1100 of FIG. 11A. Patterns 1104 of FIG. 11B occurred in the cross-section of main fluidic channel 908 (FIGS. 9A-B) at the location of z=1.3 mm and were confirmed through the confocal microscopic images and corresponding CFD simulations for the incremental pressure changes corresponding to the circled numbers over 5-second intervals (FIG. 11A). As the pressure of the perpendicular inlets (A2 and B2) increased from 9.5 kPa to 48.0 kPa, the pattern became more dispersed, concentrating at the top and bottom regions as it transformed to a defocused pattern. We also simulated this pattern transition in the xy planes (z=1.3 mm) and yz (x=150 mm).

We next quantified the capacity to focus or defocus in the xy plane at z=1.3 mm using a 2D Gaussian function as a spatial filter. The approach involved first multiplying the mass fraction of the fluorescent intensity by the 2D Gaussian function and then integrating over the channel cross-section (Equations 4 and 5, below). The filtering approaches using 2D Gaussian functions have been used previously in a variety of applications, but to our knowledge not for determining the focus degree of 3D combined-flow-interface patterns in micro-fluidic systems.

$$G(x, y) = \frac{1}{\pi f^2} \exp\left\{-\left(\frac{(x-x_c)^2}{2(f/\varepsilon)^2} + \frac{(y-y_c)^2}{2(f\varepsilon)^2}\right)\right\} \quad \{4\}$$

$$\phi(\varepsilon) = \int_{-\infty}^{\infty}\int_{-\infty}^{\infty} G(x, y)p(x, y)dxdy = \sum_{j=1}^{y_{max}}\sum_{i=1}^{x_{max}} G(x_i, y_j)p(x_i, y_j) \quad \{5\}$$

Figure 11C:
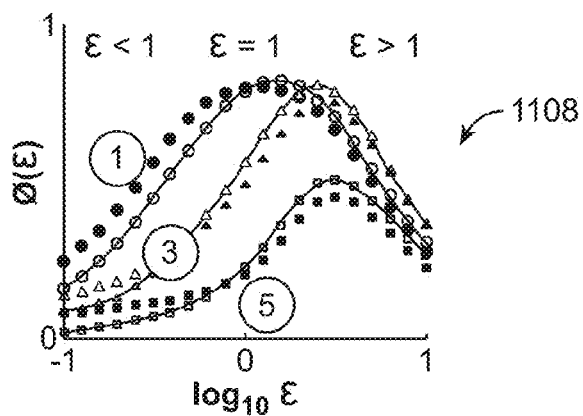
FIG. 11C is a graph of focus index versus eccentricity for the 3D combined-flow-interface patterns achieved during the controlled-pressures illustrated in the combined graph of FIG. 11A.
Figure 11D:
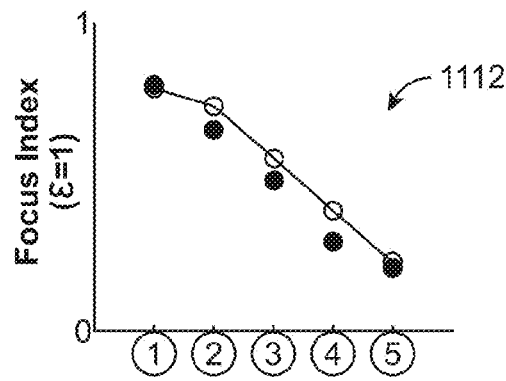
FIG. 11D is a graph of focus index with an eccentricity of 1 versus 3D combined-flow-interface pattern for the 3D-patterns achieved during the controlled-pressures illustrated in the combined graph of FIG. 11A.

The focus index $\Phi$ represents the degree of the focused pattern; f, is the focus distribution radius; $\varepsilon$ represents the eccentricity of distribution in the 2D Gaussian function. The coordinates $x_c$ and $y_c$ represent the centers of the image section plane (z=1.3 mm), and r represents the fluorescent intensity in the experimental images and also the mass fraction of the chemicals from the central inlet (C) in the simulations. FIG. 11C shows a graph 1108 of the focus index $\Phi$ for the patterns 1104 in FIG. 11B with respect to the eccentricity of the 2D Gaussian function. The maximum of the index occurs at no eccentricity ($\varepsilon$=1) when 3D-pattern 1104 was focused in 2D ($\hat{1}$). The circles, triangles, and squares represent fluorescent images (filled shapes) and CFD simulation (un-filled shapes) for the cases of ($\hat{1}$, $\hat{3}$, and $\hat{5}$). The maximum of the index shifted to $\varepsilon$>1 when 3D-pattern 1104 was 1D focused in the y-direction and vertically linear ($\hat{3}$). When 3D-pattern 1104 was defocused ($\hat{5}$), the peak shifted even further with magnitude decreasing. There was good agreement between experiments and simulations in this quantification approach. FIG. 11D is a graph 1112 revealing the linearity of the focus index $\Phi$ for the five 3D-patterns in FIG. 11B when the eccentricity parameter was held constant at $\varepsilon$=1, Using the focus index $\Phi$ with simulations enables both design of inlet pressure combinations for a specific micro fluidic channel and the design of the channels themselves without time consuming and expensive trial and error experiments.

Figure 12A:
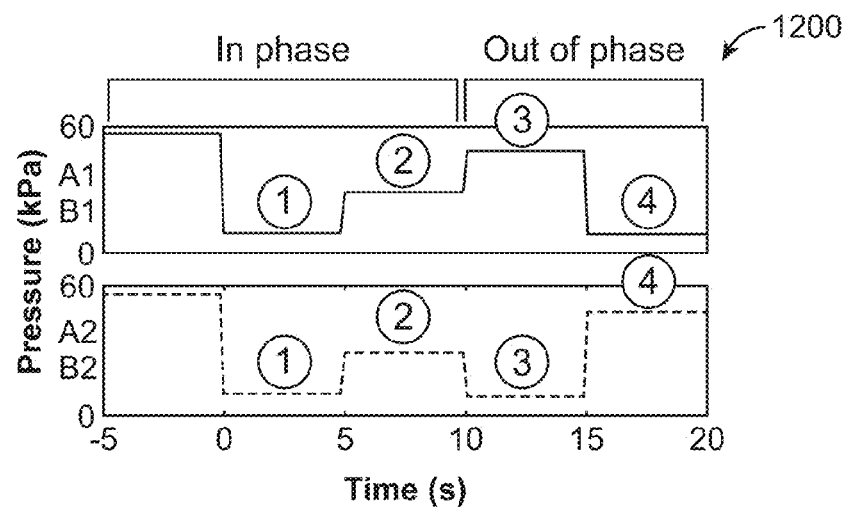
FIG. 12A is a combined graph of pressure versus time for the parallel lateral inlet flows (upper panel) and for the perpendicular lateral inlet flows (lower panel) applied during an experiment using the fluidic system of FIGS. 9A-B.
Figure 12C:
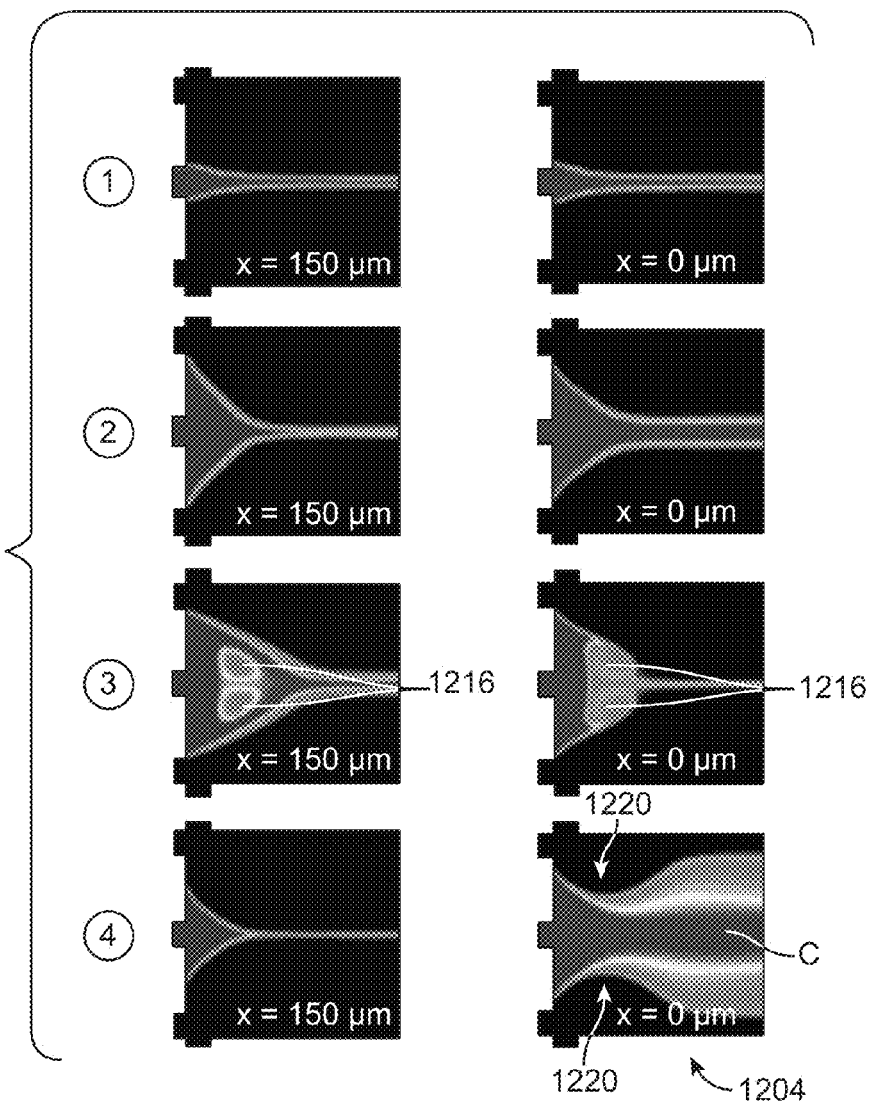
FIG. 12C is a diagram of the five-lane fluidic module of FIG. 9A showing the inlet configuration and coordinate system for the main fluidic channel represented in FIG. 12B.
Figure 12C:
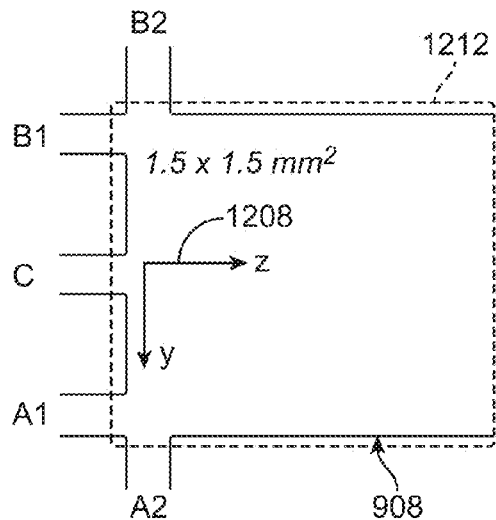

To understand how flows create these focused and defocused patterns without complicated channel geometries with using the single 2D microfluidic platform of FIGS. 9A-B, the present inventors simulated and visualized the 3D flow pattern formation for a diversity of conditions. As illustrated by combined graph 1200 of FIG. 12A, simple pressure profiles were first generated for both parallel inlets A1 and B1 from reservoir B and perpendicular inlets A2 and B2 from reservoir A. The pressures were in phase for 15 seconds and then out of phase for the following 10 seconds. Each circled number for the 5-second durations corresponded to different 3D combined-flow-interface patterns 1204 shown in FIG. 12B. FIG. 12C depicts positions of inlet A1, A2, B1, B2, and C, the coordinate system 1208, and the microscopic image range 1212. At a pressure level of 9.5 kPa for both the perpendicular inlets A2 and B2 and parallel inlets A1 and B1, 3D-pattern 1204 (FIG. 12B) remained at a relatively central location in the y-direction of main fluidic channel 908 (FIG. 12C) when examining a location in the middle of the channel (x=150 mm) and a location at the bottom of the channel (x=0 mm) for the time corresponding to $\hat{1}$. The pressure was then increased to 28.5 kPa in both parallel inlets A1 and B1 and perpendicular inlets A2 and B2 for the time corresponding to $\hat{2}$. The 3D-pattern 1204 remained focused at a central location for the y-direction at the middle of main fluidic channel 908, but 3D-pattern 1204 was much more dispersed across the x-direction at the bottom of the channel. Next, the pressure was increased to 48.0 kPa in parallel inlets A1 and B1 but decreased in perpendicular inlets A2 and B2 to 9.5 kPa for the time corresponding to $\hat{3}$.

The increase of the flow velocities caused flow separation at the confluent points of parallel inlets A1 and B1 into main fluidic channel 908 (FIG. 12C), which induced two vortices 1216 (FIG. 12B) to form inside central stream C as seen in 3D-patterns 1204 corresponding to $\hat{3}$. The 3D focused patterns 1204 in system 900 (FIGS. 9A-B) were induced by vertical asymmetry of the flow patterns due to the parabolic velocity profile as well as vortex formation near inlets A1, A2, B1, B2, and C (FIG. 12C), Conversely, when the pressure was decreased in the parallel inlets to 9.5 kPa but increased in perpendicular inlets A2 and B2 (FIG. 12C) to 48.0 kPa for the time corresponding to $\hat{4}$, flow separation at the confluence points of the perpendicular inlets into the main fluidic channel 908 induced two vortices 1220 outside central stream C due to the increase of the flow velocities. It was found that 3D focused and defocused patterns 1204 (FIG. 12B) were created through both the parabolic velocity profile and the vortex formation near inlets A1, A2, B1, B2, and C (FIG. 12C). The CFD simulations predicted all of the 3D-patterns with high experimental correlations. In addition, when the fluid stream routes were altered via valves V1-V4 (FIGS. 9A-B), 3D-pattern controller 964 could manipulate the position of central stream C from one side (+y) to the other side (-y) of main fluidic channel 908.

Figure 13A:
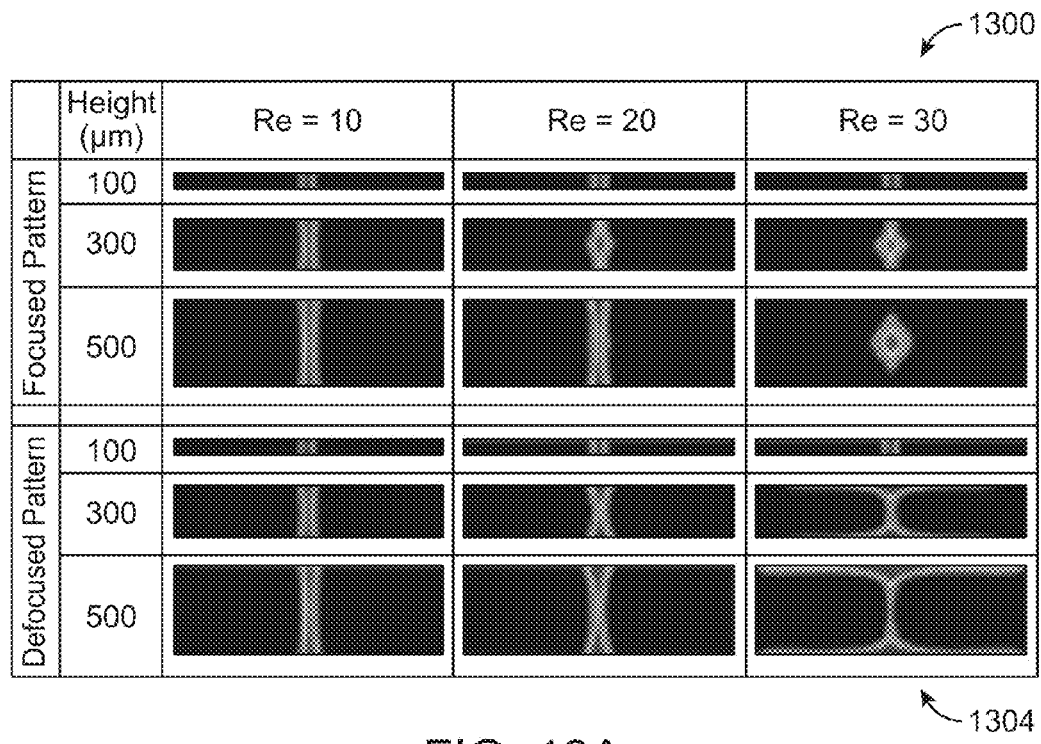
FIG. 13A is a table of renderings illustrating transverse slices of 3D combined-flow-interface patterns achieved during experiments using the fluidic system of FIGS. 9A-B, illustrating effects on the 3D-patterns of differing heights of the main fluidic channel and differing Reynolds numbers.

To determine how universal these responses are for microfluidic systems, the present inventors investigated the sensitivity of the 3D combined-flow-interface patterns to the channel height and to the Reynolds number. FIG. 13A is a chart 1300 showing section image views of the 3D-patterns 1304 at the consistent downstream location of z=1.3 mm in microfluidic channels with different heights and with respect to the Reynolds number. Three-dimensional patterns 1304 became highly focused or defocused when the channel height was increased, even when the Reynolds number did not change.

Figure 13B:
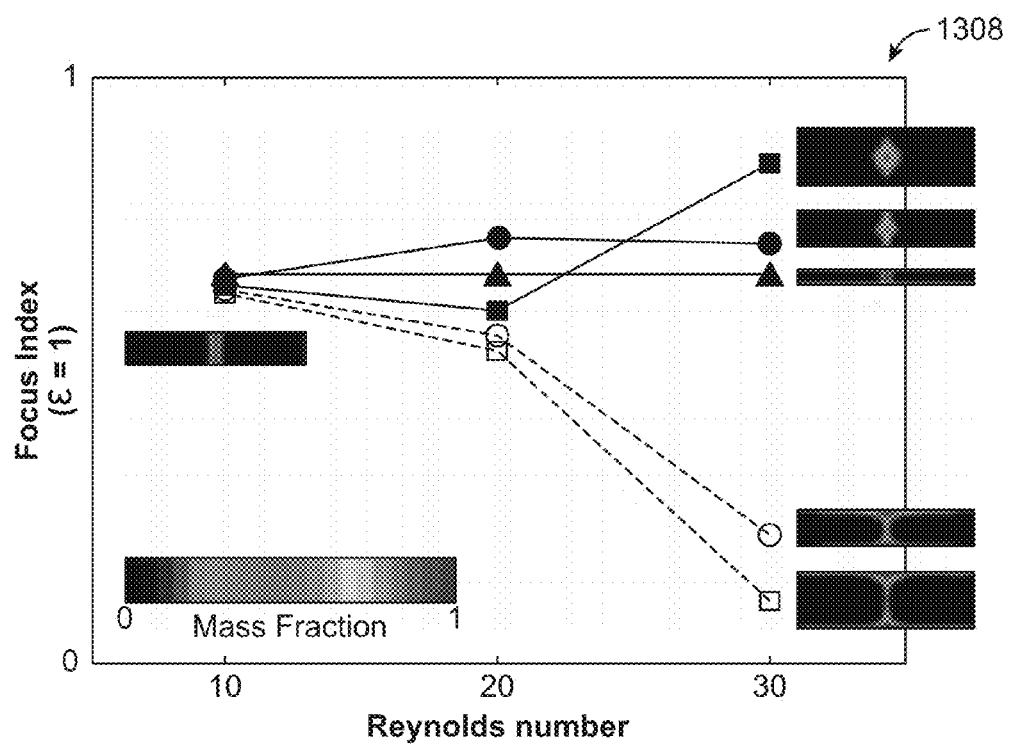
FIG. 13B is a graph of focus index with an eccentricity of 1 versus Reynolds number for differing heights of the main fluidic channel.

For example, at a channel height of 100 µm, there was no change in the vertically linear (non-3D) focused patterns even when the Reynolds number increased to 30. However, focused and defocused patterns were observed in taller channels with heights of 300 µm and 500 µm. The sensitivity to the channel height is critical as relatively larger microfluidic systems with dimensions of hundreds of micrometers to multiple millimeters are being used to study a range of problems including model organism behaviors, optofluidics, flow cytometry, and passive mixing. FIG. 13B is a graph 1308 showing the focus index Φ for 3D combined-flow-interface patterns 1304 in FIG. 13A. In graph 1308, the triangles, circles, and squares represent focused (filled shapes with solid lines) and de-focused (un-filled shapes and broke lines) patterns in the channels of heights 100 µm, 200 µm, and 300 µm, respectively. In taller channels, 2D patterns were readily 2D focused and defocused. In lower channels such as 100 µm, the patterns tended to be only vertically linear focused even when the Reynolds number increased to 30. In contrast the patterns are fully 2D focused at 500 µm but only partially 2D focused at 300 µm. Furthermore, examination of the focus index with respect to the eccentricity parameter c also revealed that the patterns were more altered in taller channels at the same Reynolds number (~30). With the focus index, we are able to not only distinguish the patterns but also address the required channel height to obtain 2D fully focused patterns at a specific Reynolds number.

In addition to the foregoing, the present disclosure is directed to a method of imparting a desired first three-dimensional (3D) pattern into a combined flow interface within a main channel of a fluidic device, wherein the main channel has a flow axis, a transverse cross-section perpendicular to the flow axis, a z-dimension extending parallel to the flow axis, and an x-y plane parallel to the transverse cross-section. This method comprises: 1) directing multiple fluid streams continuously into a the main fluidic channel so as to form a the combined-flow interface within the main channel; 2) selecting a desired degree of focus for the combined-flow interface in the x-y plane; and 3) controlling the relative flows among the multiple fluid streams in a manner that tunes the combined-flow interface to a the desired first three-dimensional (3D) pattern so that the first 3D-pattern substantially has the desired degree of focus.

In an embodiment of the immediately preceding method, the directing of multiple fluid streams includes: directing a central fluid stream into the main fluidic channel, wherein the central fluid stream has a material composition; directing at least one first lateral fluid stream into the main fluidic channel on a first lateral side of the central fluid stream, wherein the at least one first lateral fluid stream has a material composition different from the material composition of the central fluid stream; and directing at least one second lateral fluid stream into the main fluidic channel on a second lateral side of the central fluid stream opposite the first lateral side, wherein the at least one second lateral fluid stream has a material composition different from the material composition of the central fluid stream; and wherein said controlling the relative flows includes controlling the relative flows among the central, at least one first lateral, and at least one second lateral fluid streams in a manner that achieves the desired first 3D-pattern and the degree of focus.

In an aspect of the immediately preceding embodiment, each of the central fluid stream, the at least one first lateral fluid stream, and the at least one second lateral fluid stream has an inlet flow into the main fluidic channel, and the controlling of the relative flows includes controlling the relative flows so that the ratio of the inlet flow of the central fluid flow to the combined inlet flows of the at least one first lateral fluid flow and the at least one second lateral fluid flow is between 1:20 and 1:10.

In addition to the foregoing, the present disclosure is directed to a system that comprises: a fluidic device that includes 1) a main fluidic channel and multiple inlets fluidly communicating with said main fluidic channel, wherein the main fluidic channel has a flow axis; 2) a fluid delivery system in fluid operatively configured to provide multiple fluid streams, in a one-to-one manner, to the multiple inlets so that the multiple fluid streams form a combined-flow interface within the main fluidic channel when the system is operating: and 3) a 3D-pattern controller designed and configured to control the fluid delivery system in a manner that tunes the combined-flow interface to a desired first 3D-pattern, wherein the control includes: A) controlling the multiple fluid streams so that each of the multiple fluid streams is continuous while the fluid delivery system is operating to provide the desired first 3D-pattern; and B) controlling relative flows of the multiple fluid streams so that the combined-flow interface substantially achieves a preselected degree of focus in a plane perpendicular to said flow axis.

In an embodiment of the immediately preceding system, 1) the multiple inlets include: A) a central-fluid-stream inlet to the main fluidic channel, the central-fluid-stream inlet having B) a first lateral side and a second lateral side opposite said first lateral side; C) at least one first lateral-fluid-stream inlet to the main fluidic channel, the at least one first lateral-fluid-stream inlet located on said first lateral side of the central-fluid-stream inlet; and D) at least one second lateral-fluid-stream inlet to the main fluidic channel, the at least one second lateral-fluid-stream inlet located on the second lateral side of the central-fluid-stream inlet; 2) the fluid delivery system is designed and configured to provide: A) a central fluid stream to the central-fluid-stream inlet; B) at least one first lateral fluid stream corresponding respectively to the at least one first lateral-fluid-stream inlet; and C) at least one second lateral fluid stream corresponding respectively to the at least one second lateral-fluid-stream inlet; and 3) the fluid delivery system includes a flow regulation system responsive to said 3D-pattern controller so as to regulate mass flow of at least one of A) the central fluid stream, B) the at least one first lateral fluid stream, and C) the at least one second lateral fluid stream.

In an aspect of the immediately preceding embodiment, each of the central fluid stream, the at least one first lateral fluid stream, and the at least one second lateral fluid stream has an inlet flow into the main fluidic channel, and the 3D-pattern controller is operatively configured to control the fluid delivery system so that the ratio of the inlet flow of the central fluid flow to the combined inlet flows of the at least one first lateral fluid flow and the at least one second lateral fluid flow is between 1:20 and 1:10.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of imparting a desired first three-dimensional (3D) pattern into a combined flow interface within a main channel of a two-dimensional fluidic device, wherein the main channel has a flow axis, a transverse cross-section perpendicular to the flow axis, a z-dimension extending parallel to the flow axis, and an x-y plane parallel to the transverse cross-section, the method comprising:

directing multiple fluid streams continuously into the main fluidic channel so as to form the combined-flow interface within the main channel;

selecting a desired degree of focus for the combined-flow interface in the x-y plane; and controlling the relative flows among the multiple fluid streams in a manner that tunes the combined-flow interface to the desired first 3D pattern so that the first 3D-pattern substantially has the desired degree of focus.

2. A method according to claim 1, wherein said directing multiple fluid streams includes:

directing a central fluid stream into the main fluidic channel, wherein the central fluid stream has a material composition;

directing at least one first lateral fluid stream into the main fluidic channel on a first lateral side of the central fluid stream, wherein the at least one first lateral fluid stream has a material composition different from the material composition of the central fluid stream; and directing at least one second lateral fluid stream into the main fluidic channel on a second lateral side of the central fluid stream opposite the first lateral side, wherein the at least one second lateral fluid stream has a material composition different from the material composition of the central fluid stream; and wherein said controlling the relative flows includes controlling the relative flows among the central, at least one first lateral, and at least one second lateral fluid streams in a manner that achieves the desired first 3D-pattern and the degree of focus.

3. A method according to claim 2, wherein each of the central fluid stream, the at least one first lateral fluid stream, and the at least one second lateral fluid stream has an inlet flow into the main fluidic channel, and said controlling the relative flows includes controlling the relative flows so that the ratio of the inlet flow of the central fluid flow to the combined inlet flows of the at least one first lateral fluid flow and the at least one second lateral fluid flow is between 1:20 and 1:10.

4. A method according to claim 2, wherein said directing at least one first lateral fluid stream includes directing at least two first lateral fluid streams into the main fluidic channel.

5. A method according to claim 4, wherein said directing at least two first lateral fluid streams includes directing the at least two first lateral fluid streams into the main fluidic channel at differing main-fluidic-channel input angles.

6. A method according to claim 5, further comprising controlling the flow of the at least two first lateral fluid streams relative to one another to achieve a desired combined effective input angle for the at least two first lateral fluid streams.

7. A method according to claim 2, wherein:

said directing at least one first lateral fluid stream includes directing at least two first lateral fluid streams into the main fluidic channel; and said directing at least one second lateral fluid stream includes directing at least two second lateral fluid streams into the main fluidic channel.

8. A method according to claim 7, wherein:

said directing the at least two first lateral fluid streams includes directing two first lateral fluid streams into the main fluidic channel at differing main-fluidic-channel input angles; and said directing the at least two second lateral fluid streams includes directing two first second fluid streams into the main fluidic channel at differing main-fluidic-channel input angles.

9. A method according to claim 8, further comprising:
controlling the flow of the at least two first lateral fluid streams relative to one another to achieve a desired combined effective input angle for the at least two first lateral fluid streams; and
controlling the flow of the at least two second lateral fluid streams relative to one another to achieve a desired combined effective input angle for the at least two second lateral fluid streams.

10. A method according to claim 1, further comprising controlling the relative flows in a manner that changes the desired first 3D-pattern to a second 3D-pattern different from the desired first 3D-pattern.

11. A method according to claim 1, wherein said controlling the relative flows includes controlling the relative flows so that the flow of each of the multiple fluid streams has a Reynolds number in a range from about 10 to about 100.

12. A method according to claim 1, further comprising selecting a height for the main fluidic channel as a function of the desired first 3D-pattern and the degree of focus.

13. A method according to claim 1, wherein said directing multiple fluid streams includes:
directing a central fluid stream into the main fluidic channel;
directing only one first lateral fluid stream into the main fluidic channel on a first lateral side of the central fluid stream; and
directing only one second lateral fluid stream into the main fluidic channel on a second lateral side of the central fluid stream opposite the first lateral side;
the method further comprising selecting first and second main-fluidic-channel input angles for, respectively, the first and second lateral fluid stream as a function of the desired first 3D interface pattern and the degree of focus.

14. A method according to claim 1, further comprising monitoring the combined-flow interface within the main fluidic channel, wherein said controlling the relative flows includes controlling the relative flows as a function of said monitoring.

15. A method according to claim 1, wherein said controlling the relative flow includes looking up at least one flow-parameter setting as a function of the desired first 3D-pattern.

16. A method according to claim 1, wherein said controlling the relative flows includes adjusting the mass flow rate of at least one of the multiple fluid streams.

17. A method according to claim 16, wherein said adjusting the mass flow rate of at least one of the multiple lateral fluid streams includes changing pressure in a fluid reservoir-fluid resistor system.

18. A method according to claim 1, wherein the multiple fluid streams have an average inlet width at their inlets to the main fluidic channel, and said directing multiple fluid streams includes directing the multiple fluid streams so that the distance between adjacent ones of the multiple fluid streams is at least about 1.5 times the average inlet width.

19. A system, comprising:
a two-dimensional fluidic device that includes a main fluidic channel and multiple inlets fluidly communicating with said main fluidic channel, wherein said main fluidic channel has a flow axis;
a fluid delivery system in fluid operatively configured to provide multiple fluid streams, in a one-to-one manner, to said multiple inlets so that the multiple fluid streams form a combined-flow interface within said main fluidic channel when the system is operating; and
a 3D-pattern controller designed and configured to control said fluid delivery system in a manner that tunes the combined-flow interface to a desired first 3D-pattern, wherein the control includes:
controlling the multiple fluid streams so that each of the multiple fluid streams is continuous while the fluid delivery system is operating to provide the desired first 3D-pattern; and
controlling relative flows of the multiple fluid streams so that the combined-flow interface substantially achieves a preselected degree of focus in a plane perpendicular to said flow axis.

20. A system according to claim 19, wherein said multiple inlets have an average inlet width and adjacent ones of said multiple inlets are spaced at a distance of at least 1.5 times said average inlet width.

21. A system according to claim 19, wherein:
said multiple inlets include:
a central-fluid-stream inlet to said main fluidic channel, said central-fluid-stream inlet having a first lateral side and a second lateral side opposite said first lateral side;
at least one first lateral-fluid-stream inlet to said main fluidic channel, said at least one first lateral-fluid-stream inlet located on said first lateral side of said central-fluid-stream inlet; and
at least one second lateral-fluid-stream inlet to said main fluidic channel, said at least one second lateral-fluid-stream inlet located on said second lateral side of said central-fluid-stream inlet;
said fluid delivery system is designed and configured to provide:
a central fluid stream to said central-fluid-stream inlet;
at least one first lateral fluid stream corresponding respectively to said at least one first lateral-fluid-stream inlet; and
at least one second lateral fluid stream corresponding respectively to said at least one second lateral-fluid-stream inlet; and
said fluid delivery system includes a flow regulation system responsive to said 3D-pattern controller so as to regulate mass flow of at least one of 1) the central fluid stream, 2) the at least one first lateral fluid stream, and 3) the at least one second lateral fluid stream.

22. A system according to claim 21, wherein each of the central fluid stream, the at least one first lateral fluid stream, and the at least one second lateral fluid stream has an inlet flow into said main fluidic channel, and said 3D-pattern controller is operatively configured to control said fluid delivery system so that the ratio of the inlet flow of the central fluid flow to the combined inlet flows of the at least one first lateral fluid flow and the at least one second lateral fluid flow is between 1:20 and 1:10.

23. A system according to claim 21, wherein:
said at least one first-lateral-fluid-stream inlet includes at least two first lateral-fluid-stream inlets having corresponding respective flow axes skewed relative to one another;
said fluid delivery system is designed and configured to provide at least two first lateral fluid streams corresponding respectively to said at least two first lateral-fluid-stream inlets; and
said 3D-pattern controller is designed and configured to control relative flow rates of the at least two first lateral fluid streams to adjust a combined inlet pattern formed within said main fluidic channel by the at least two first lateral flow streams.

24. A system according to claim 19, further comprising a flow-interface monitoring system designed and configured to monitor the flow interface within said main fluidic channel and to output a feedback signal, wherein said 3D-pattern controller is designed and configured to control said fluid delivery system as a function of the feedback signal.

25. A system according to claim 19, wherein said 3D-pattern controller is operatively configured to allow a user to select at least one of 1) the desired first 3D pattern and 2) the preselected degree of focus.

26. A system according to claim 25, wherein said 3D-pattern controller comprises a lookup table containing fluid-flow control parameters for controlling said fluid delivery system.

27. A system according to claim 19, wherein said 3D-pattern controller is operatively configured to automatedly change the desired first 3D-pattern to a second 3D-pattern different from the desired first 3D-pattern in response to a user selection of the second pattern.

* * * * *

UNITED STATES PATENT AND TRADEMARK OFFICE
CERTIFICATE OF CORRECTION

PATENT NO.        : 8,695,618 B2                              Page 1 of 1
APPLICATION NO.   : 13/334346
DATED             : April 15, 2014
INVENTOR(S)       : Yong Tae Kim et al.

It is certified that error appears in the above-identified patent and that said Letters Patent is hereby corrected as shown below:

In the Claims:

- Column 17, claim 1, line 63. Specifically, delete the word(s) "two-dimensional" after the word and/or indefinite article "a"" to read as "a fluidic device"

- Column 19, claim 19, line 57. Specifically, delete the word(s) "two-dimensional" after the word and/or indefinite article "a" to read as "a fluidic device"

Signed and Sealed this
Eighth Day of July, 2014

Michelle K. Lee
*Deputy Director of the United States Patent and Trademark Office*